(12) United States Patent
Zondervan et al.

(10) Patent No.: US 7,647,561 B2
(45) Date of Patent: Jan. 12, 2010

(54) SYSTEM, METHOD AND COMPUTER PROGRAM PRODUCT FOR APPLICATION DEVELOPMENT USING A VISUAL PARADIGM TO COMBINE EXISTING DATA AND APPLICATIONS

(75) Inventors: Quinton Y. Zondervan, Boston, MA (US); Umair A. Khan, Fremont, CA (US)

(73) Assignee: NVIDIA International, Inc., St. Michael (BB)

( * ) Notice: Subject to any disclaimer, the term of this patent is extended or adjusted under 35 U.S.C. 154(b) by 1354 days.

(21) Appl. No.: 10/318,504

(22) Filed: Dec. 13, 2002

(65) Prior Publication Data

US 2003/0115572 A1 Jun. 19, 2003

Related U.S. Application Data

(63) Continuation-in-part of application No. 09/953,372, filed on Sep. 14, 2001, now Pat. No. 7,185,286, and a continuation-in-part of application No. 09/942,047, filed on Aug. 28, 2001, and a continuation-in-part of application No. 09/942,080, filed on Aug. 28, 2001, now abandoned.

(60) Provisional application No. 60/341,344, filed on Dec. 14, 2001.

(51) Int. Cl.
    G06F 3/00 (2006.01)
    G06F 9/00 (2006.01)
    G06F 17/00 (2006.01)

(52) U.S. Cl. .................. 715/762; 715/764; 715/704

(58) Field of Classification Search .................. 715/704, 715/762, 764

See application file for complete search history.

(56) References Cited

U.S. PATENT DOCUMENTS

| | | | | |
|---|---|---|---|---|
| 5,321,838 | A * | 6/1994 | Hensley et al. | 717/125 |
| 5,485,460 | A | 1/1996 | Schrier et al. | 370/94.1 |
| 5,717,860 | A * | 2/1998 | Graber et al. | 709/227 |
| 5,748,499 | A * | 5/1998 | Trueblood | 702/187 |
| 6,034,963 | A | 3/2000 | Minami et al. | 370/401 |
| 6,418,471 | B1 * | 7/2002 | Shelton et al. | 709/227 |
| 6,631,345 | B1 * | 10/2003 | Schumacher et al. | 703/22 |
| 6,757,900 | B1 * | 6/2004 | Burd et al. | 719/316 |

(Continued)

OTHER PUBLICATIONS

Office Action Summary from U.S. Appl. No. 09/942,047 which was mailed on May 24, 2007.

*Primary Examiner*—Kieu Vu
*Assistant Examiner*—Sabrina L. Greene
(74) *Attorney, Agent, or Firm*—Zilka-Kotab, PC

(57) ABSTRACT

A system, method and computer program product are provided for generating an application. An interaction with a first application is recorded for capturing a functionality of the first application. An interaction with a second application is also recorded for capturing a functionality of the second application. A pattern is generated based on the recorded interactions. An application is generated based on the pattern. The interactions recorded in the pattern are repeated upon replay of the pattern for providing the functionalities of the first and second applications. A method for executing the pattern-based application is provided. Upon receiving a request for data, a pattern for retrieving the requested data is selected. The pattern is replayed. The recorded interaction is conducted as specified in the pattern for obtaining the requested data. The requested data is received.

26 Claims, 28 Drawing Sheets

U.S. PATENT DOCUMENTS

| | | | |
|---|---|---|---|
| 7,185,286 B2 | 2/2007 | Zondervan et al. | 715/762 |
| 2002/0059073 A1 | 5/2002 | Zondervan et al. | 704/270.1 |
| 2002/0152159 A1 | 10/2002 | Khan et al. | 705/39 |
| 2003/0013492 A1 | 1/2003 | Bokhari et al. | 455/566 |
| 2003/0050931 A1 | 3/2003 | Harman et al. | 707/100 |
| 2003/0051059 A1 | 3/2003 | Zondervan et al. | 709/250 |
| 2003/0080994 A1 | 5/2003 | Yepishin et al. | 345/738 |
| 2003/0120762 A1 | 6/2003 | Yepishin et al. | 709/223 |
| 2004/0205454 A1 | 10/2004 | Gansky et al. | 715/500 |

\* cited by examiner

SYSTEM, METHOD AND COMPUTER PROGRAM PRODUCT FOR APPLICATION DEVELOPMENT USING A VISUAL PARADIGM TO COMBINE EXISTING DATA AND APPLICATIONS

RELATED APPLICATIONS

This application claims priority from U.S. Provisional Patent Application Ser. No. 60/341,344 entitled SYSTEM, METHOD AND COMPUTER PROGRAM PRODUCT FOR APPLICATION DEVELOPMENT USING A VISUAL PARADIGM TO COMBINE EXISTING DATA AND APPLICATIONS, filed Dec. 14, 2001; and is a continuation in part of the following copending patent applications: U.S. Patent Application entitled SYSTEM, METHOD AND COMPUTER PROGRAM PRODUCT FOR THE RECORDING AND PLAYBACK OF TRANSACTION MACROS, filed non-provisionally Aug. 28, 2001 under Ser. No. 09/942,047; U.S. Patent Application entitled SYSTEM, METHOD AND COMPUTER PROGRAM PRODUCT FOR PATTERN REPLAY USING STATE RECOGNITION, filed non-provisionally Aug. 28, 2001 now abandoned under Ser. No. 09/942,080; and U.S. Patent Application entitled INTERFACE FOR MOBILIZING CONTENT AND TRANSACTIONS ON MULTIPLE CLASSES OF DEVICES, filed non-provisionally Sep. 14, 2001 under Ser. No. 09/953,372, now U.S. Pat. No. 7,185,286; each of which is assigned to common assignee NVIDIA International, Inc., and herein incorporated by reference.

FIELD OF THE INVENTION

The present invention relates to computer programming, and more particularly to creating new applications using functionality from existing applications.

BACKGROUND OF THE INVENTION

The term application is a shorter form of application program. An application program is a program designed to perform a specific function directly for the user or, in some cases, for another application program. Examples of applications include word processors, database programs, Web browsers, development tools, drawing, paint, image editing programs, and communication programs. Applications use the services of the computer's operating system and other supporting applications. The formal requests and means of communicating with other programs that an application program uses is called the application program interface (API).

In computing, a program is a specific set of ordered operations for a computer to perform. In the modem computer that John von Neumann outlined in 1945, the program contains a one-at-a-time sequence of instructions that the computer follows. Typically, the program is put into a storage area accessible to the computer. The computer gets one instruction and performs it and then gets the next instruction. The storage area or memory can also contain the data that the instruction operates on. (Note that a program is also a special kind of "data" that tells how to operate on "application or user data.")

Programs can be characterized as interactive or batch in terms of what drives them and how continuously they run. An interactive program receives data from an interactive user (or possibly from another program). A batch program runs and does its work, and then stops. Batch programs can be started by interactive users who request their interactive program to run the batch program. A command interpreter or a Web browser is an example of an interactive program. A program that computes and prints out a company payroll is an example of a batch program. Print jobs are also batch programs.

When a program is created, it is written using some kind of computer language. The language statements are the source program. The developer then "compiles" the source program (with a special program called a language compiler) and the result is called an object program (not to be confused with object-oriented programming). There are several synonyms for object program, including object module and compiled program. The object program contains the string of 0s and 1s called machine language that the logic processor works with. The machine language of the computer is constructed by the language compiler with an understanding of the computer's logic architecture, including the set of possible computer instructions and the length (number of bits) in an instruction.

From the above, it should be apparent that it takes weeks to create an application, even for a skilled programmer. Consider the following example. Company A want to develop an enterprise travel application. The application is to be constantly running, monitoring a human resources database for details on when executives are traveling, then going into a travel site (such as Travelocity.com, etc.) and checking flight times, checking confirmations, etc. The application is also to access a rental car site and make reservations. Upon completing the aforementioned tasks, the application is to allow each employee to check the status of his or her itinerary. The application is also to send alerts to the manager and/or administrative assistant of the employee regarding the travel arrangements.

To create such an application, a developer has to program the application to access several types of databases and gather data, process the data, and send the processed data out to potentially several types of devices (PC, phone, PDA, Blackberry, etc.). One skilled in the art will appreciate the time that must be spent when writing the code for such an application, ensuring that all API's are properly coded to, etc.

What is needed is a method of creating an application quickly and efficiently without requiring the typical weeks and months of coding and debugging.

Another problem inherent in the prior art is that most applications are created for the desktop. In an enterprise situation, a client-server implementation is most typical. However, only one client can interact with a particular session of the software. As modern businesses expand, they will grow to rely on enterprise-wide applications. Thus, pervasive computing will become the rule.

What is needed is a way to provide pervasive (vs. desktop) applications that are accessible throughout an enterprise on various types of devices and via multiple modes of connection.

Web services (sometimes called application services) are services (usually including some combination of programming and data, but possibly including human resources as well) that are made available from a business's Web server for Web users or other Web-connected programs. Providers of Web services are generally known as application service providers. Web services range from such major services as storage management and customer relationship management (CRM) down to much more limited services such as the furnishing of a stock quote and the checking of bids for an auction item. The accelerating creation and availability of these services is a major Web trend.

Users can access some Web services through a peer-to-peer arrangement rather than by going to a central server. Some services can communicate with other services and this exchange of procedures and data is generally enabled by a class of software known as middleware. Services previously possible only with the older standardized service known as Electronic Data Interchange (EDI) increasingly are likely to become Web services. Besides the standardization and wide availability to users and businesses of the Internet itself, Web services are also increasingly enabled by the use of the Extensible Markup Language (XML) as a means of standardizing data formats and exchanging data. XML is the foundation for the Web Services Description Language (WSDL).

Several companies provide the building blocks for creating Web services. However, one problem inherent in creating Web services is that a developer is limited by the number of building blocks he or she has access to. In other words, the developer has a "fixed menu" of building blocks, and must write code for any additional functionality desired.

What is needed is a methodology for reusing exiting functionality rather than having to create custom applications for each desired function. Such a methodology would allow companies to leverage existing infrastructure, thereby saving money.

SUMMARY OF THE INVENTION

A developer is able to stitch together components of existing applications, including web applications, web services, legacy applications, enterprise applications, mainframe applications, WINDOWS® applications, and a JAVA® applications and is also able to add new application functionality using a variety of programming languages including Java, JavaScript and SQL, all using a visual paradigm that allows the application to be built very quickly. Using an intuitive user interface, the developer can publish the new application as a web service. The newly developed application can be made accessible on multiple devices via any type of network, wireless or Internet connection.

This process allows the application to be created quickly without requiring the developer to spend days and weeks writing code for a new application. Rather, using the processes set forth herein, selected portions of applications in an existing infrastructure can be reused to provide new functionality and applications. The developer simply interacts with the existing applications and those interactions are recorded to capture the resulting functionality.

Accordingly, a system, method and computer program product are provided for generating an application. An interaction with a first application, preferably at the user-interface level, is recorded for capturing a functionality of the first application. An interaction with a second application is also recorded for capturing a functionality of the second application. Note that the interactions may be user interactions, interactions by other applications, etc. A pattern is generated based on the recorded interactions. The pattern can be saved in memory such as in a file on a hard disk. An application is generated based on the pattern. The interactions recorded in the pattern are repeated upon replay of the pattern for providing the functionalities of the first and second applications.

This allows the application to be created quickly without requiring the developer to spend weeks and months writing code for a new application. Rather, using the process set forth above and below, selected portions of an existing infrastructure can be reused to provide new functionality and applications. The developer simply interacts with the existing applications and those interactions are recorded.

According to one embodiment, additional functionality can be added to the pattern. The pattern can be displayed on a graphical user interface, where the pattern includes a graphical representation of each interaction. According to another embodiment, when recording the interaction with one or more of the applications, an interface can be displayed. The user is allowed to specify interactions with the application(s) via the interface. The user interactions are recorded and become part of the pattern.

The application can be published as a network service accessible via the Internet, an intranet, or other network. Further, a rendering of the output from the application can be specified for transcoding and output on multiple types of devices the content can be rendered for output on multiple types of devices such as a desktop computer, a wireless telephone, a PDA, and/or any other type of device.

A method for creating an application utilizing a graphical user interface is also provided. First, an interface is displayed. A user is allowed to specify interactions with multiple applications via the interface. These interactions are recorded. A pattern is generated based on the recorded interactions. The pattern is displayed on a graphical user interface, and the pattern includes a graphical representation of each interaction. Such graphical representation can be an icon, etc. The user is allowed to add additional functionality to the pattern. A graphical representation of the additional functionality is also displayed on the graphical user interface.

Preferably, the user is allowed to connect representations of the interactions via the graphical user interface for specifying an order of execution of the interactions in the pattern. As an option, the pattern can include prerecorded interactions. Thus, previously recorded interactions can be used as "building blocks" for the new application, thereby avoiding the need to re-record the interaction. They are merely retrieved from storage and added to the pattern to provide functionality.

According to an embodiment, if a portion of the pattern is recognized as a prefix of an already existing pattern, a branching of the pattern is created from the already existing pattern. Also, the pattern can be coupled to another pattern to provide additional functionality. The other pattern can be a previously created pattern that has been stored. Preferably, output relating to the pattern can be specified for multiple client devices.

Once the application has been created, the pattern-based application can be executed. Upon receiving a request for data from a user or another application, a pattern for retrieving the requested data is selected based on stored information associating the pattern with the desired functionality required to obtain the requested data. The pattern has stored therein a recorded interaction with at least one external application. The interaction accesses the functionality of the external application, thereby permitting data to be obtained from the external application. The pattern is replayed to execute the recorded interaction. The recorded interaction is conducted as specified in the pattern for obtaining the requested data. The requested data is received and can be further processed and/or output.

The received data can then be processed for output on a particular type of device as specified in the pattern, and/or can be processed for output on multiple types of devices via transcoding.

DESCRIPTION OF THE PREFERRED EMBODIMENTS

Figure 1:
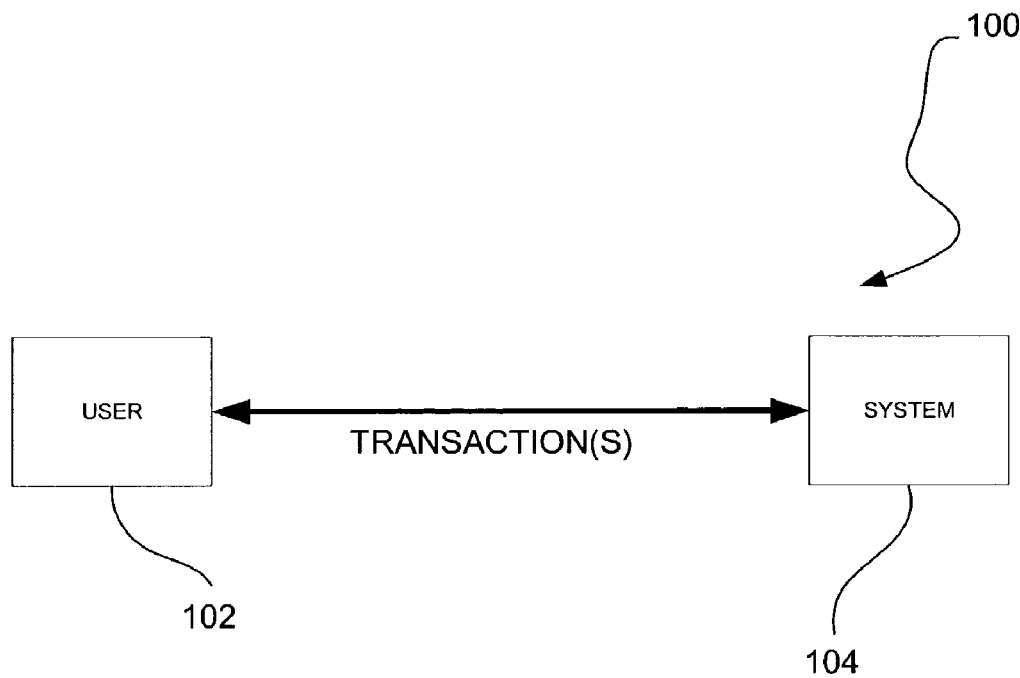
FIG. 1 illustrates a system including a user and a system, in accordance with one embodiment.

FIG. 1 illustrates a system 100 including a user 102 and a system 104, in accordance with one embodiment of the present invention. During use, the user 102 and the system 104 interact during transactions. In the present invention, a transaction refers to communicating (i) information and/or actions required to conduct the transaction, and/or (ii) information and/or actions sent back or desired by the user, respectively.

For example, a transaction, in one embodiment, may refer to: information submitted by the user, actions taken by the user, actions taken by a system enabling the access of the user to the data, actions taken by the data to retrieve/modify content, results sent back to the user, and/or any combination or portion of the foregoing entities.

Figure 2:
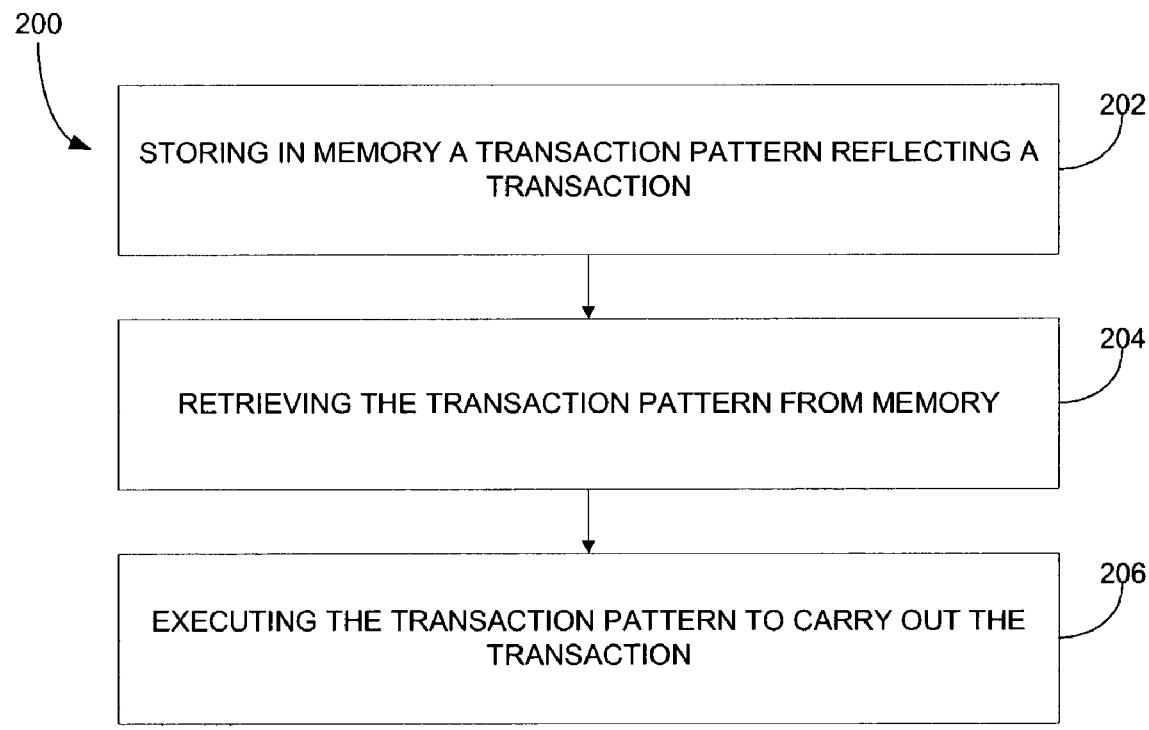
FIG. 2 illustrates a method for carrying out a computer-implemented transaction.

FIG. 2 illustrates a method 200 for carrying out a computer-implemented transaction. Initially, in operation 202 a transaction pattern reflecting a transaction is stored in memory. This may be carried out while the transaction is happening.

In one embodiment of the present invention, the transaction pattern may include a record of: information submitted by a user, actions taken by the user, actions taken by a system to generate results, and results sent to the user. As an option, the transaction pattern may include a record of actions taken by the system which enable access of the user to data, and actions enabled by the data to retrieve content. Storage in accordance with operation 202 may take any form with sufficient identification and description of any required step in the transaction process.

Figure 2A:
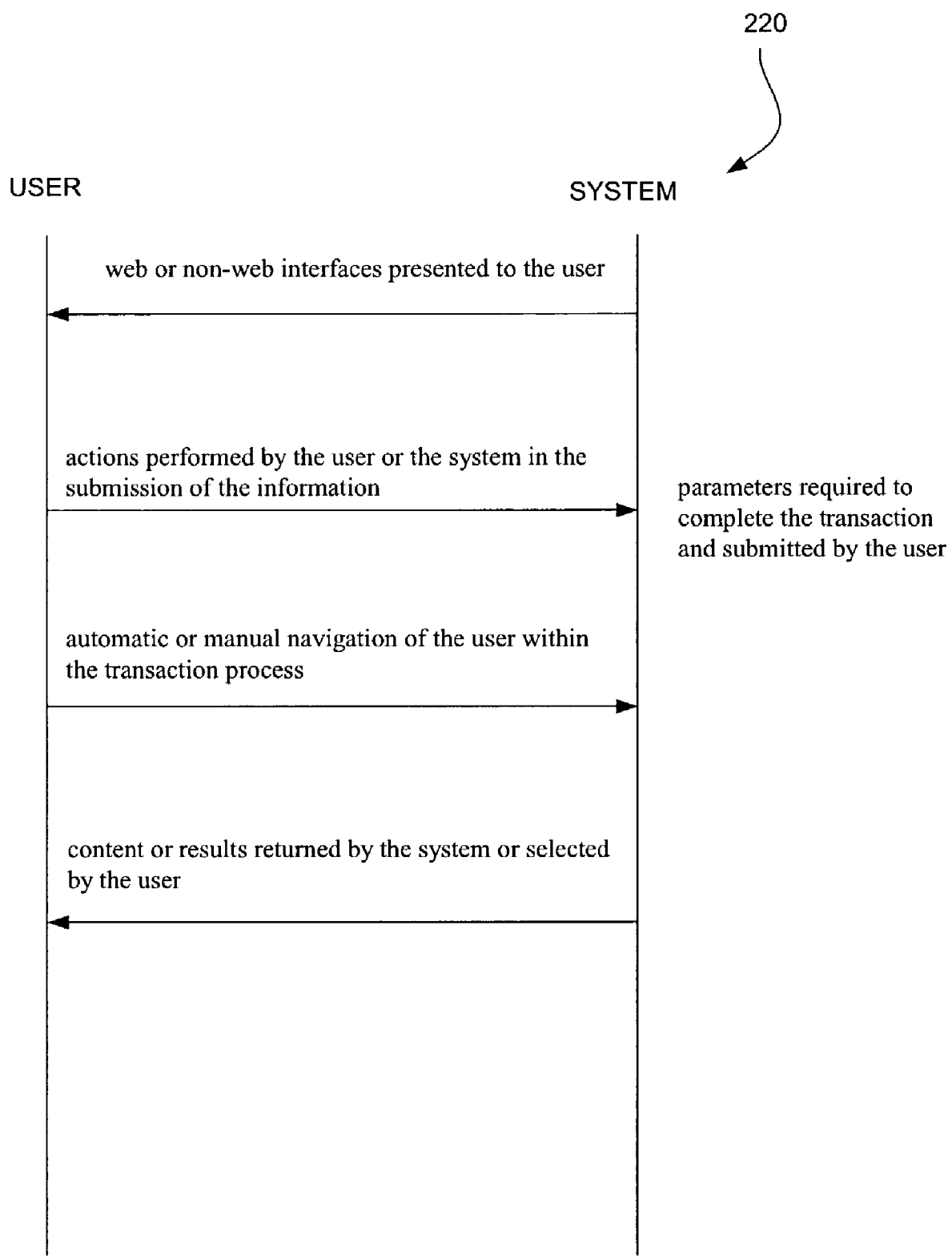
FIG. 2A illustrates an exemplary flow diagram showing information that may be stored with the transaction pattern.

FIG. 2A illustrates an exemplary flow diagram 220 illustrating the various information which may be stored during operation 202 of FIG. 2. For example, such information may involve (i) the web or non-web interfaces presented to the user, (ii) the actions performed by the user or the system in the submission of the information, (iii) the parameters required to complete the transaction and submitted by the user, (iv) the automatic or manual navigation of the user within the transaction process, and/or (v) the content or results returned by the system or selected by the user.

During use of the present invention, such transaction pattern may be retrieved from memory when desired in operation 204. Thereafter, the transaction pattern is executed to carry out the transaction in an automated manner. Note operation 206. An execution, or playback, in accordance with operation 206 may include the invocation of a stored transaction pattern.

Figure 2B:
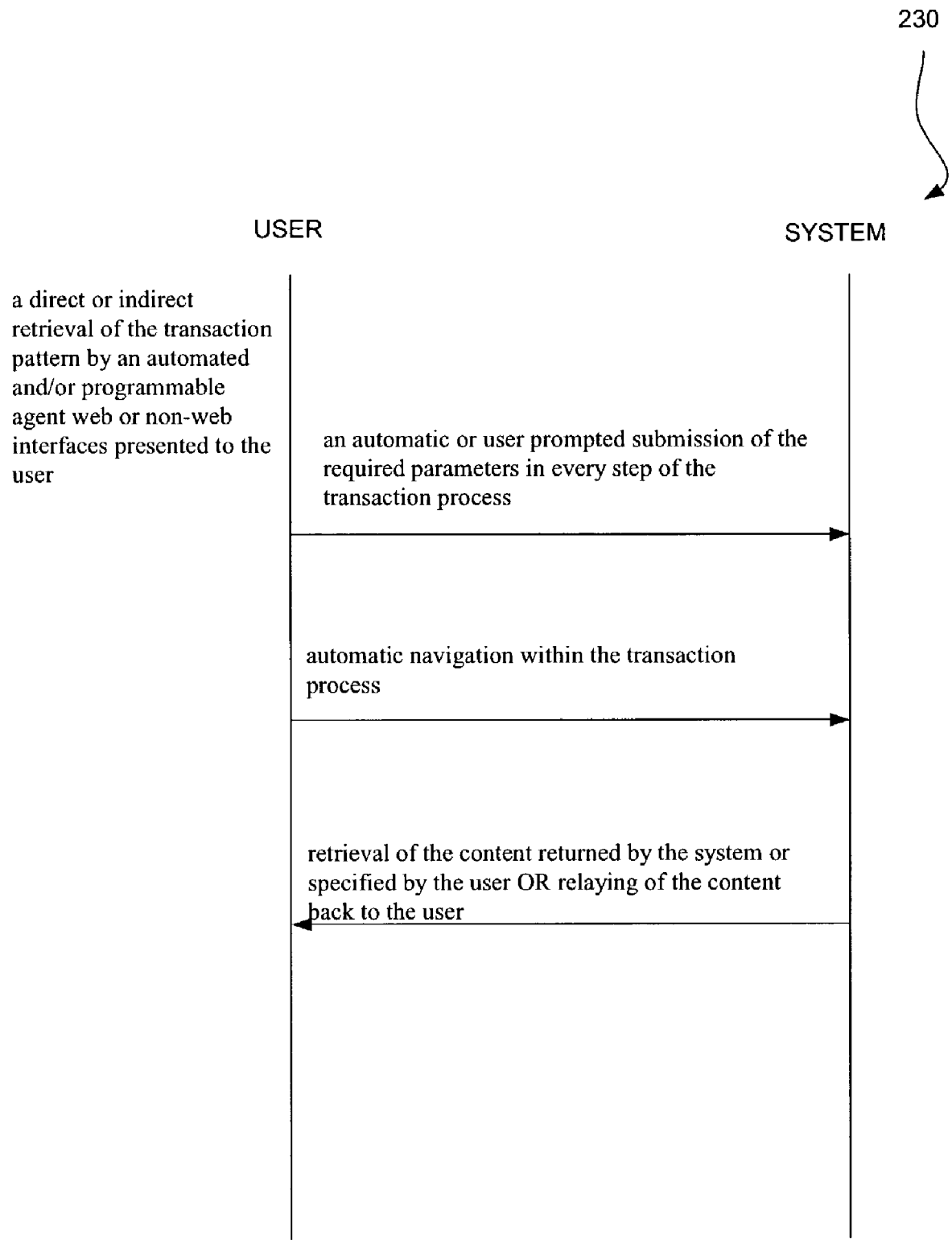
FIG. 2B illustrates an exemplary flow diagram showing the manner in which a transaction pattern may be executed.

FIG. 2B illustrates an exemplary flow diagram 230 illustrating the various operations that may occur during execution of a transaction pattern in accordance with operation 206 of FIG. 2. Such may involve: (i) a direct or indirect retrieval of the transaction pattern by an automated and/or programmable agent, i.e. a computer server/client, an active or dormant program, a human being, etc. (ii) an automatic or user prompted submission of the required parameters in every step of the transaction process, (iii) the automatic navigation within the transaction process, (iv) a retrieval of the content returned by the system or specified by the user, and/or (v) the relaying of the content back to the user.

A transaction pattern for any transaction need only be recorded once by anyone with sufficient system access privilege. Once recorded, any user may conduct that transaction, any number of times, by the invocation of the recorded transaction pattern, or "transaction macro."

Since a transaction macro can be stored in any fashion and invoked, directly or indirectly, by any agent (human or automated), it enables the completion of the transaction it describes in any fashion from any device.

System Architecture

Figure 3:
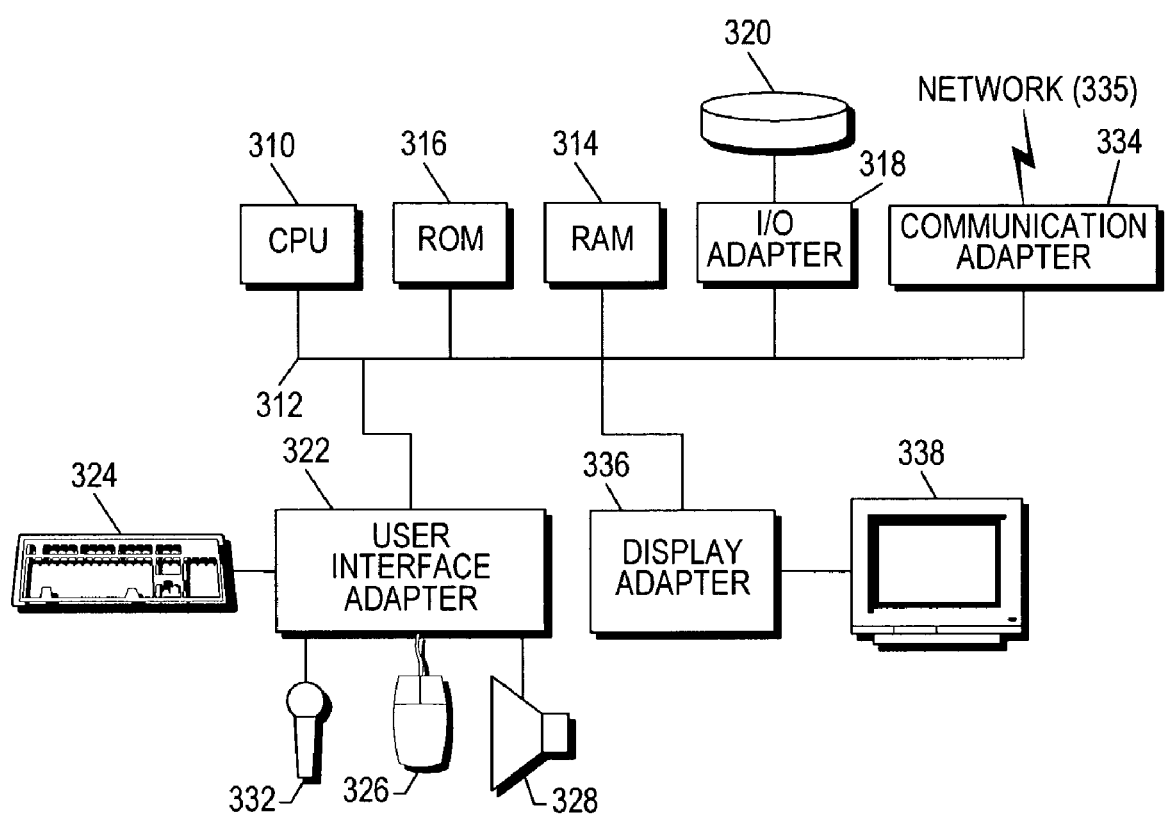
FIG. 3 shows a representative hardware environment on which the method of FIG. 2 may be implemented.

FIG. 3 shows a representative hardware environment on which the method 200 of FIG. 2 may be implemented. Such figure illustrates a typical hardware configuration of a workstation in accordance with a preferred embodiment having a central processing unit 310, such as a microprocessor, and a number of other units interconnected via a system bus 312.

The workstation shown in FIG. 3 includes a Random Access Memory (RAM) 314, Read Only Memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network 335 (e.g., a data processing network) and a display adapter 336 for connecting the bus 312 to a display device 338.

The workstation typically has resident thereon an operating system such as the Microsoft Windows NT or Windows 2000. Operating System (OS), the IBM OS/2. operating system, the MAC OS, or UNIX operating system. Those skilled in the art may appreciate that the present invention may also be implemented on platforms and operating systems other than those mentioned.

Applications

Following is a plurality of exemplary applications of the present invention. It should be noted that such examples are not exhaustive, and should not be construed as limiting.

Scenario I

Figure 4:
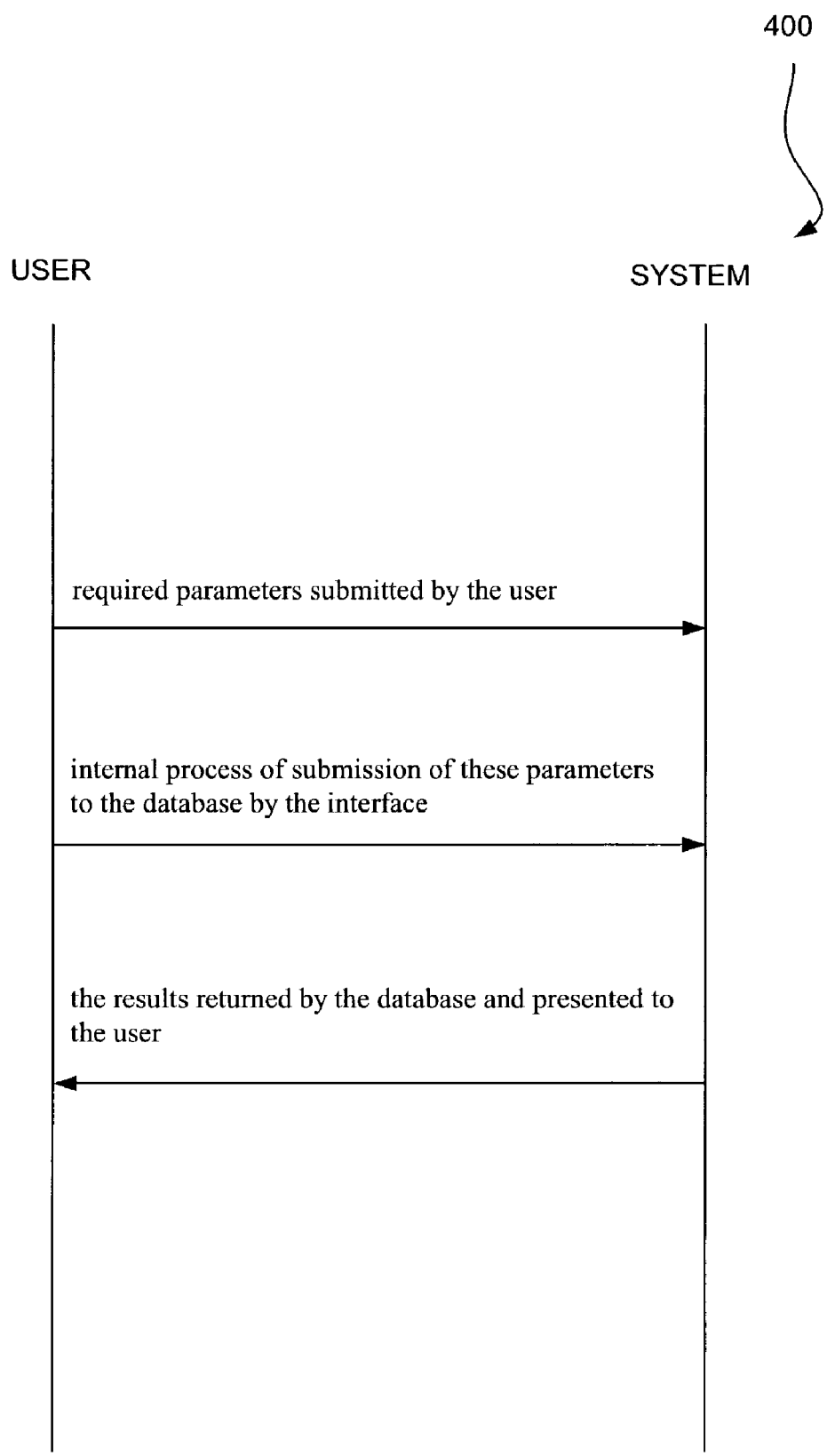
FIG. 4 illustrates an exemplary flow diagram illustrating the various components of a first exemplary transaction pattern.

FIG. 4 illustrates an exemplary flow diagram 400 illustrating the various components of a first exemplary transaction pattern. During operation, a user wishes to retrieve a record from a database. The retrieval of the record involves submitting the required parameters into an interface presented to the user for interacting with the database. Once the parameters are submitted, the results are sent back to the user in some predetermined manner.

In this case, the transaction pattern includes: (i) required parameters submitted by the user (ii) the entire internal process of submission of these parameters to the database by the interface and (iii) the results returned by the database and presented to the user. Note FIG. 4.

Scenario II

Figure 5:
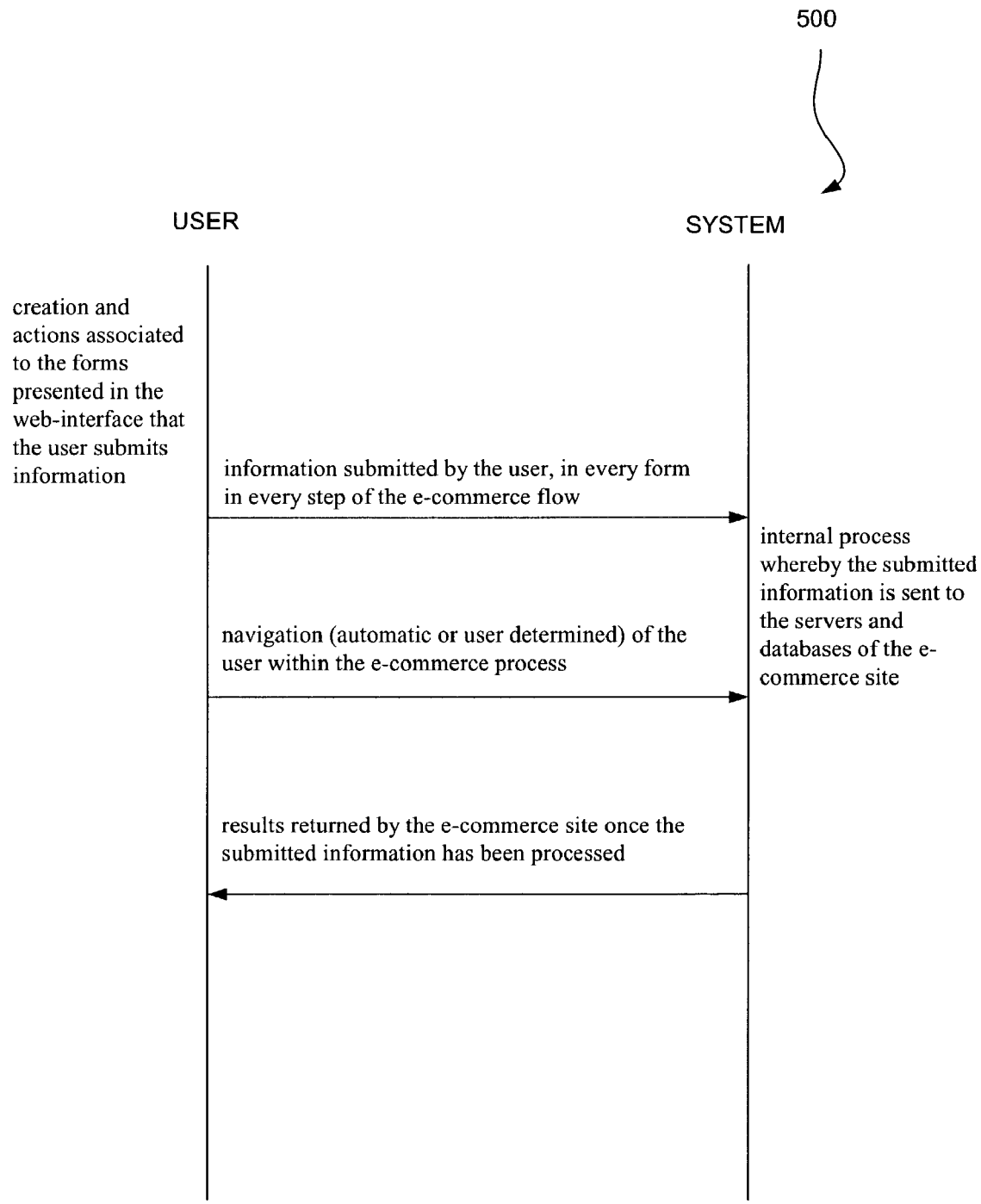
FIG. 5 illustrates an exemplary flow diagram illustrating the various components of a second exemplary transaction pattern.

FIG. 5 illustrates an exemplary flow diagram 500 illustrating the various components of a second exemplary transaction pattern. During operation, a user wishes to purchase an item from an e-commerce web site. The user interacts with the e-commerce interface presented on the web site and submits the required information to purchase the item. The user potentially fills out multiple forms (in multiple steps) that request the user's name, credit card information, shipping address, etc. Once the information has been entered, it is processed and the purchase is approved or rejected.

In this case, the transaction pattern consists of (i) the creation and actions associated with the forms presented in the web-interface with which the user submits information (ii) the information submitted by the user, in every form in every step of the e-commerce flow (iii) the internal process whereby the submitted information is sent to the servers and databases of the e-commerce site (iv) the navigation (automatic or user determined) of the user within the e-commerce process and (v) the results returned by the e-commerce site once the submitted information has been processed. Note FIG. 5.

Scenario III

Figure 6:
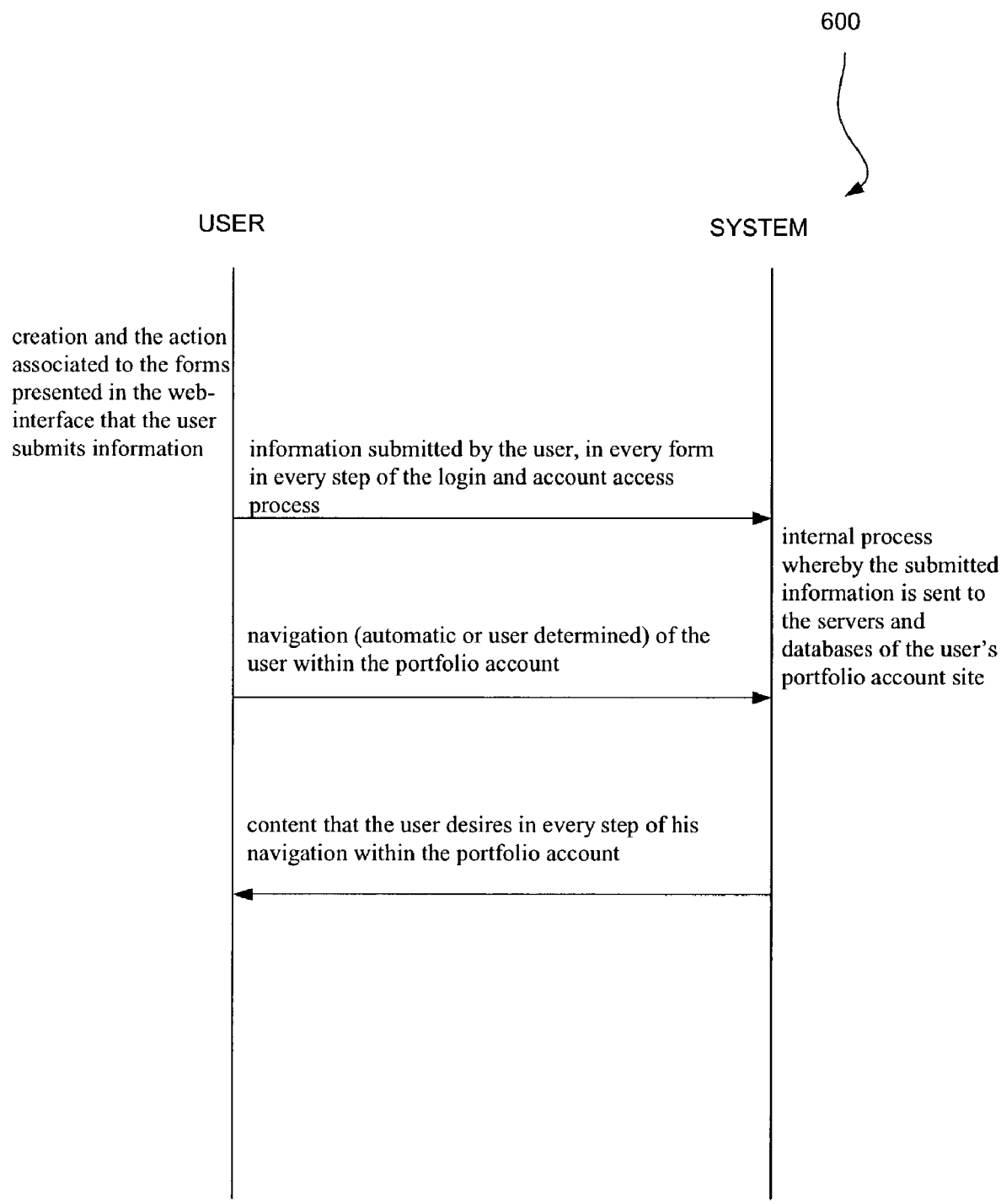
FIG. 6 illustrates an exemplary flow diagram illustrating the various components of a third exemplary transaction pattern.

FIG. 6 illustrates an exemplary flow diagram 600 illustrating the various components of a third exemplary transaction pattern. During operation, a user wishes to log into his stock portfolio account and view his portfolio. He supplies his username, password and potentially other information to gain secure access to this personal information. Once he is logged in, he wishes to view a table summarizing the performance of his stocks. To get to this table, he has to click on a series of hyperlinks, one after the other.

In this case, the transaction pattern consists of (i) the creation and the action associated with the forms presented in the web-interface with which the user submits information (ii) the information submitted by the user, in every form in every step of the login and account access process (iii) the internal process whereby the submitted information is sent to the servers and databases of the user's portfolio account site (iv) the navigation (automatic or user determined) of the user within the portfolio account and (v) all the content that the user desires in every step of his navigation within the portfolio account. Note FIG. 6.

In all of these scenarios, the user submits and retrieves different pieces of information in multiple steps. While it is possible to submit information in this fashion from a desktop computer, it becomes increasingly inconvenient once a user tries to do so through devices other than PC's where the entry of information is not as convenient. Therefore, a process whereby a query or a transaction can be completed and the resulting content sent to the user with a minimum amount of information input and navigation, is highly desirable.

The present invention thus allows any transaction to be automated through the concept of the recording and the playback of a "transaction macro."

Dynamic Content

Figure 7:
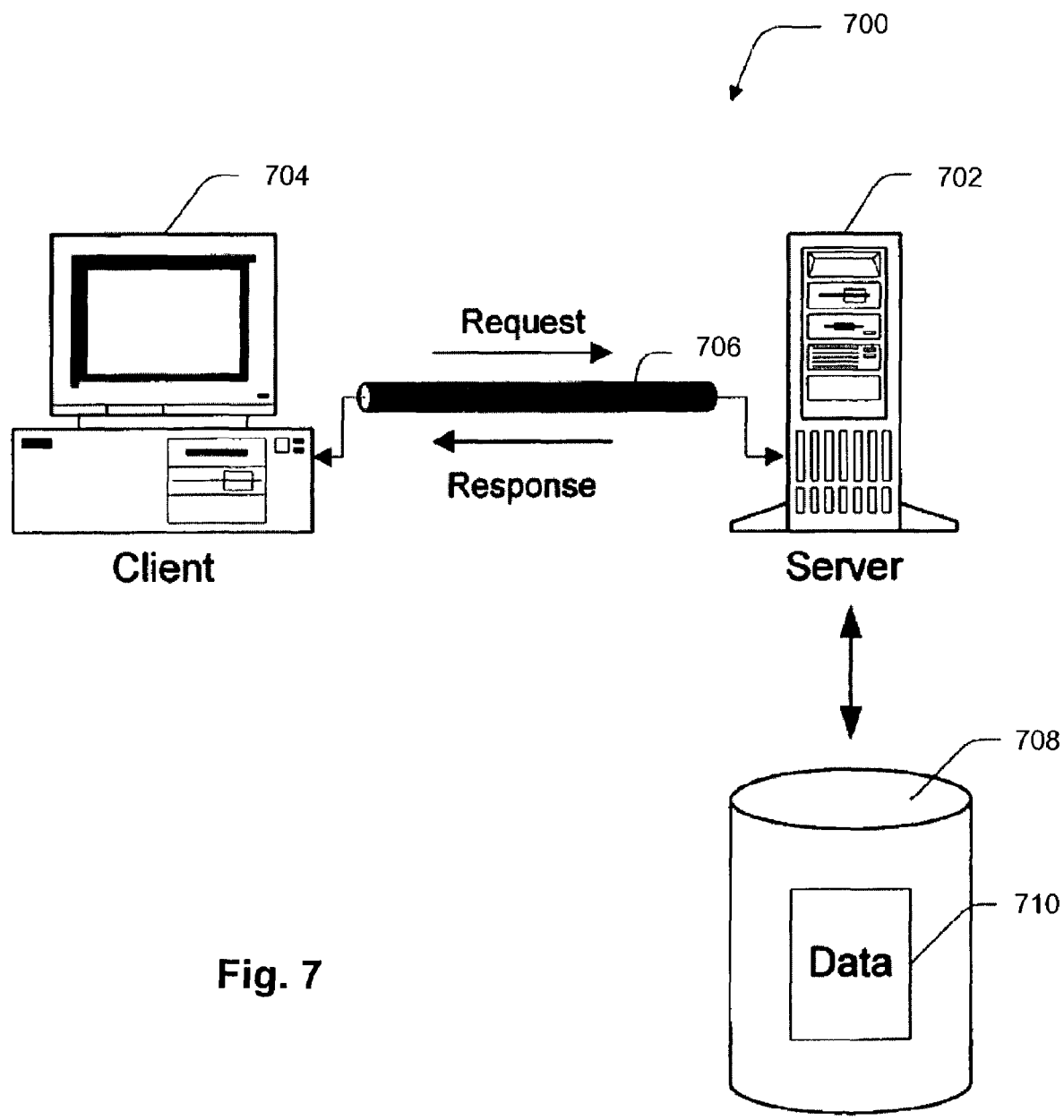
FIGS. 7-9 illustrate an example of dynamic content in the context of an embodiment.

A description of dynamic content in the context of the present invention will now be set forth along with a comparison with static content. A computer network system has one or more host network servers connected to serve data to one or more client computers over a network. FIG. 7 shows a simple computer network system 700 with a single host network server 702 connected to serve data to a client 704 via a network 706. The client 704 sends a request for data and/or services to the server 702 over the network 706. The server 702 processes the request and returns a response over the network 706. If the request is for data, the server 702 accesses a database 708 to retrieve the requested data 710 and returns the data 710 as part of the response.

The client-server system 700 is representative of many different environments. One particular environment of interest is the Internet. The server 702 runs a Web server software program that accepts requests from client-based programs (e.g., browsers) and returns data 710 in the form of Web pages or documents to the client 704. The Web pages are commonly written in HTML (hypertext markup language) and XML (extensible markup language). Web pages are transmitted using conventional network protocols, such as TCP/IP (Transmission Control Protocol/Internet Protocol), HTTP (Hypertext Transfer Protocol) and DCOM (Distributed Component Object Model). The client 704 executes a browser or other application to render the Web page into human-perceptible forms. A Web document might include text, images, sound, video, active code, and so forth.

Documents served from a server to client are typically generated using either or both of two methods: a static content method and a dynamic content method. In a static content method, the document is created in advance and stored statically on a server database. When a client requests the document, the server retrieves the document and transmits it over the network to the client. FIG. 7 is an example in which the server retrieves the static data 710 from database 708 and serves the data to the client 704. It is further noted that conventional servers, and particularly Web servers, may be configured to push the content to the client without receiving a request. The static content method has an advantage of minimizing the user's perceived response time, meaning the time between requesting the document and seeing it rendered on a computer screen. It has a disadvantage that all users who request the document receive exactly the same content. With static content, the server cannot respond to specific user requests or personalize a document for individual users.

In a dynamic content method, the document is generated dynamically by the server. When a client requests a document, the server invokes one or more agents, feeding the agents relevant parameters from the user's request (such as the user's name). The agent(s) generate the document that satisfies the user's request and the server returns the document over the network to the client. The dynamic content method has the advantage of responding to specific user requests or personalizing content for individual users. It has the disadvantage that the user's perceived response time will generally be longer than with static document requests. This is because the document generation process involves additional time to invoke the appropriate agent(s) and generate the document.

The server generates dynamic content documents by invoking an agent in one of two ways: an "out-of-process" method and an "in-process" method. In an "out-of-process" method, the agent runs in its own process and address space, separate from the server's process and address space. Typically, the out-of-process method uses the industry-standard common gateway interface (CGI) as the communication mechanism between the server and agent. In an "in-process" method, the agent runs within the Web server's process and address space. The in-process method typically uses a vendor-specific application programming interface, like the Internet Server Application Programming Interface (ISAPI) implemented by Internet Information Server (IIS), which is available from Microsoft Corporation.

To illustrate the two dynamic content methods and how they can be used in conjunction with the static content method, consider a scenario in which the server 702 runs a Web server for an online retail company. When the client 704 first accesses the Web site, the server 702 might retrieve a pre-existing home page for the company from the database 708 and serve that page to the client 704. This initial step is an example of a static content method. From the home page, the client might request to view an online catalog of products offered by the company. In response, the Web server might invoke a catalog agent to guide the user through various product offerings. When the user decides to purchase a product, the client submits an order request. In response, the Web server might invoke an order agent to assist the user in ordering the product. The steps involved with actively serving a catalog or taking an order are examples of dynamic content methods. They both involve dynamic generation of documents in response to input received from the client.

Figure 8:
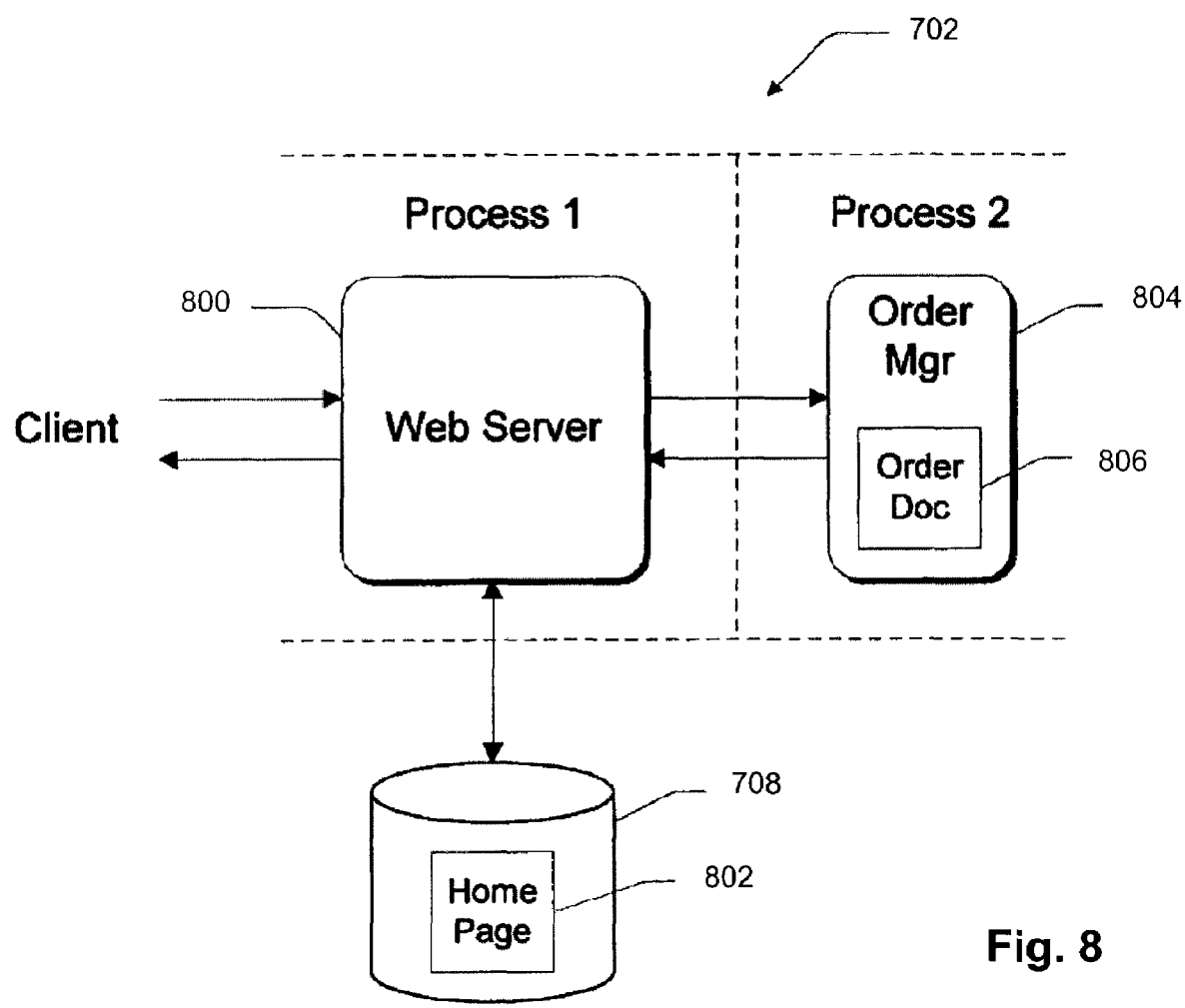

FIG. 8 shows an "out-of-process" method under this scenario. The server 702 runs a Web server 800 as process 1. The Web server 800 handles the incoming requests from the client. When the client first hits the Web site, the Web server 800 retrieves the company's home page 802 from the database 708 and transmits the home page 802 to the client. When the client sends an order request, the Web server 800 initiates an order manager 804 to assist the user with ordering the desired product or service. The order manager 804 is initiated using the CGI technology as a second process 2, which uses a separate process and address space than process 1, as represented by the dashed lines. When the user selects an item, the order manager 804 dynamically generates an order document 806 that contains the user's name, a description of the selected item, the cost of the item, and payment terms. The order manager 804 returns the order document 806 to the Web server 800, which then serves the document 806 to the client. Afterwards, the order manager 804 is terminated and the second process 2 is halted.

The out-of-process method shown in FIG. 8 has an advantage in crash prevention and recovery. If the out-of-process order manager 804 is unreliable and ultimately crashes, it will not cause the Web server 800 to crash. However, the out-of-process method has a disadvantage in that a particular agent must be loaded into memory each time a request arrives for it. Using CGI technology, the agent must also be unloaded from memory once it finishes the request. This loading and unloading consumes resources, resulting in a relatively slow response time. Another problem compounding the slowness is that the out-of-process method involves cross-process communication between processes 1 and 2, including such activities as marshalling, messaging, and the like.

A variation of CGI, known as FastCGI, allows the server to keep the agent loaded, rather than terminating the agent each time it responds to a particular request. FastCGI is an improvement over CGI in that it saves the per-request invocation overhead, thereby improving the response time. However, the FastCGI is still run in a separate process, and hence the drawbacks associated with cross-process communication remain.

Figure 9:
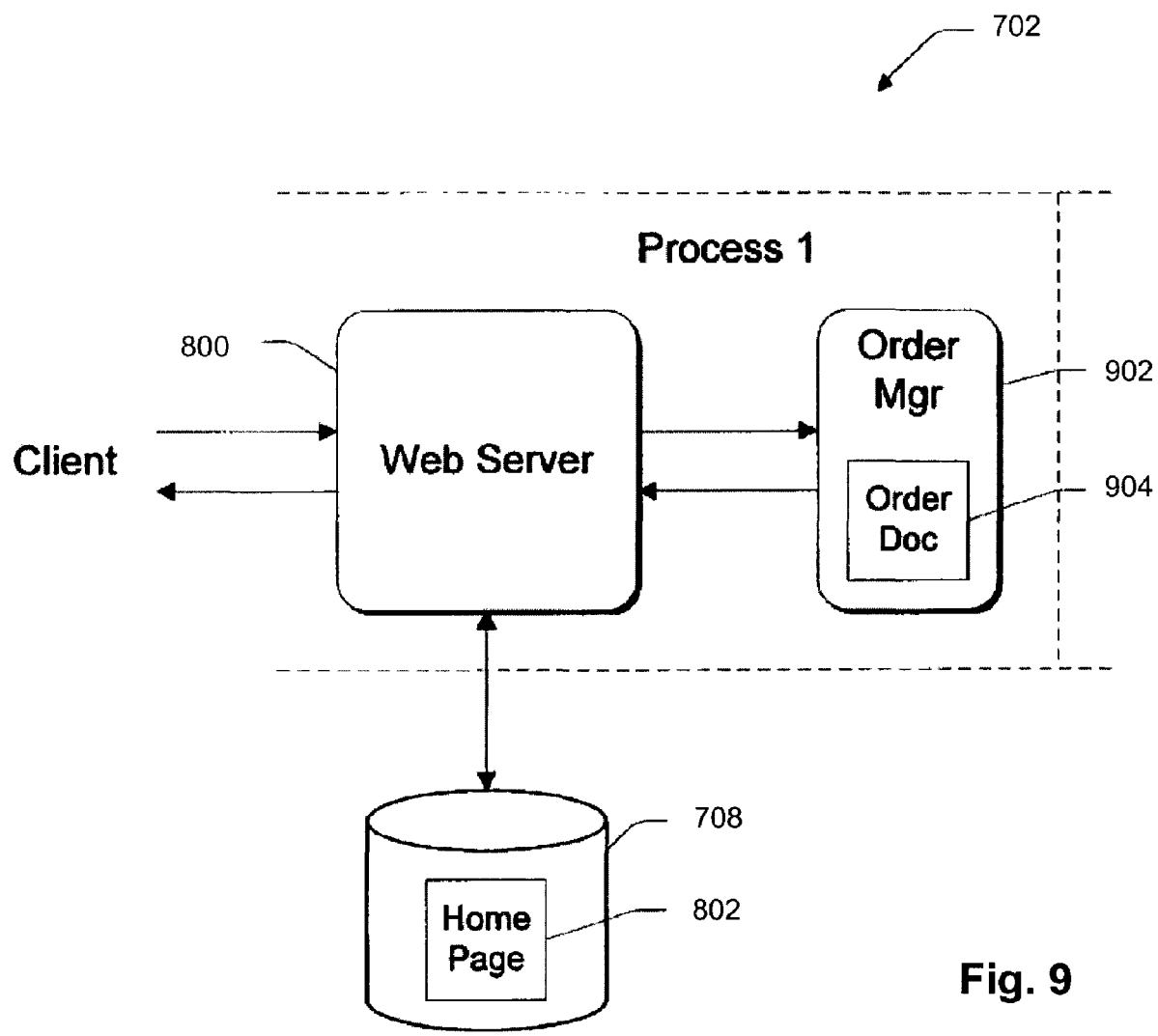

FIG. 9 shows an "in-process" method under the same scenario of the online retail company. In this case, when the client sends an order request, the Web server 800 initiates an order manager 902 to assist the user with ordering the desired product or service. The order manager 902 is initiated using the ISAPI technology to run within the same process 1 as the Web server 800. That is, the Web server 800 and the order manager 902 use the same process and address space designated by the server. When the user selects an item from the online catalog, the order manager 902 dynamically generates an order document 904 that contains the user's name, a description of the selected item, the cost of the item, and payment terms. The order manager 902 returns the order document 904 to the Web server 800, which then serves the document 806 to the client. The order manager 902 can remain loaded for other requests, or terminated when desired.

The in-process method is advantageous in that a particular agent need only be loaded into memory once, when the first request arrives for it. The agent can then remain in memory within the server's process and address space, and can handle additional requests that arrive for it. The in-process method has a further advantage in that there is no need for cross-process communication. As a result, the in-process method is comparatively faster than the out-of-process method.

Pattern Recording

A preferred embodiment of the present invention gives its users the ability to create (record) functional elements called patterns and use those elements (replay) in their custom applications. A pattern consists of a collection of states. A state refers to the state of an application in its interaction by the user (the designer). States can be of different types. For example, an action that requires accessing the World Wide Web can be represented by an XML (or other type) state and an action that would require sending e-mail can be a part of an SMTP state. Each type of state has a dedicated connector, which is used to create the state definitions and operate on those states. Thus, an XML Connector Module (XCM) is the connector that aids in recording and replaying of XML states. A database connector is used to store and retrieve data from a database, but may or may not point to a next state. An HTML Connector points to a next table. For example, the HTML Connector in state A would instruct a User Agent to execute action X to access state C. The User Agent is used to fetch the output from a remote application and execute any user actions on that output.

Figure 10:
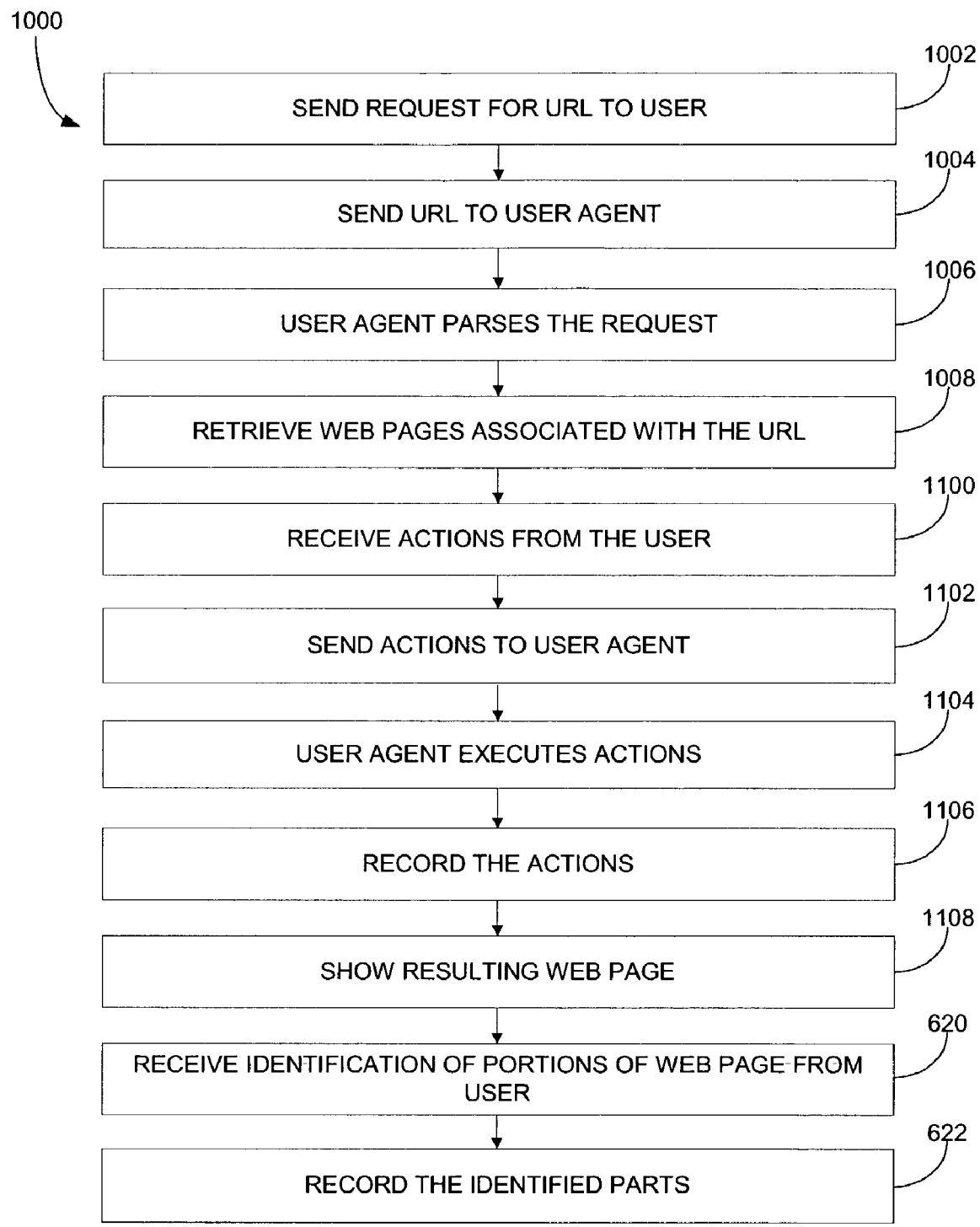
FIG. 10 is a flow chart that illustrates a method for recording a pattern using the User Agent according to one embodiment.

FIG. 10 is a flow chart 1000 that illustrates a method for recording a pattern using the User Agent. In particular, the user performs the desired navigation and associated input, which are recorded. In operation 1002, the user is asked for a URL. Upon receiving the URL from the user, the URL is sent to the User Agent in operation 1004. The User Agent parses the request in operation 1006 to determine a meaning of the request. In operation 1008, the User Agent retrieves the web page associated with the URL and sends it back to the user. This (and other) web pages are represented in the pattern as States. In operation 1010, actions are received from the user. Such actions can include selection of links, input of data in fields, etc. The User Agent receives the user input in operation 1012, and in operation 1014, executes the actions on the remote website. The actions are recorded in operation 1016. The resulting web page is shown the to the user in operation 1018. The user then identifies the parts of the page he or she is interested in, which is received in operation 1020. The identified parts are recorded in operation 1022. Note that the inputs entered by the user during recording can be generalized by associating a variable with those inputs, which can be changed during replay.

The system now knows how to retrieve desired information using the pattern. Accordingly, all users using the system can obtain that content. The next (or same) user that wants to perform a similar action enters the URL of the pattern by selecting it. The pattern is replayed with the User Agent executing the actions received of operation 1014. The parts of the web page that were identified by the user and stored in operation 1022 are returned to the user. The user can also define a default area to access in the event that a state is not recognized. See also the description below regarding state identification based on content and probability.

The information stored in a pattern may involve (i) the web or non-web interfaces presented to the user, (ii) the actions performed by the user or the system in the submission of the information, (iii) the parameters required to complete the transaction and submitted by the user, (iv) the automatic or manual navigation of the user within the transaction process, and/or (v) the content or results returned by the system or selected by the user.

A transaction pattern for any transaction need only be recorded once by anyone with sufficient system access privilege. Once recorded, any user may conduct that transaction, any number of times, by the invocation of the recorded transaction pattern, or "transaction macro."

Since a transaction pattern can be stored in any fashion and invoked, directly or indirectly, by any agent (human or automated), it enables the completion of the transaction it describes in any fashion from any device.

Interactive Design Tool (IDT)

The Interactive Design Tool according to one embodiment allows a user to mobilize content and transactions on to multiple classes of devices. Some specific examples of the use of the IDT include:

Mobilize an existing web application (manipulate the data for output on a mobile device).

Create a new mobile application based partially on existing content from the web, a database etc. (For example, giving a salesperson the ability to mark an order as closed from a mobile device resulting in a legacy database system being updated)

Create a Web Integration application based on the interaction of multiple existing web applications.

Configure the basic view presented by the mobilization program (i.e. editing the application layout schema). Note that this last feature is conceptually different from the first three as it operates at a "higher" level; it defines the containers within which the various applications defined in the first three cases above may appear.

Application Views

The IDT graphical user interface provides several views according to one embodiment.

Workplaces

The first view is the Workplace view. Workplace views are the views within which the designer specifies the content and/or transaction by example. For example, while mobilizing web content, the Web Workplace presents a browser view to the designer where the designer can indicate specific content by clicking on the areas of interest. The workplace records the usage pattern in the background. If the designer is mobilizing content stored in a database, the Database Workplace displays the appropriate database connection dialogs. Thus, the workplace is at all times, aware of the class of content/transactions the designer is mobilizing and provides the appropriate view. The designer accesses content with multiple types of connectors. Connectors are functional blocks that allow access via various methods such as Web, database connectivity, FTP, etc.

Pattern View

The Pattern View is a view where the designer is able to manipulate the properties of the pattern. The Pattern View can also allow the designer to create a pattern manually and/or add pattern elements directly. Several functions enabled by the Pattern View follow.

The Pattern View allows formal pattern specification. Especially for web patterns, the pattern recorded in the Workplace represents only one possible interaction path. For example, the pattern may only represent a successful login into an online account. However, in actual usage, a user may also encounter an unsuccessful login. The Pattern View is used to visually specify such alternate paths in a flowchart format. Note that formal specification may be needed not just for the web connector. For example, some connectors may require error handling alternate interaction paths. See the section on Recording Alternate Paths, below, for further details.

The Pattern View also enables cross-connector flow, including design of complex interactions that span multiple types of connectors. For example, consider an interaction that obtains content like stock quotes from the web and inserts them into a database. The two pieces of this interaction (web and database) are individually recorded within the Workplace. However, the Pattern View is where the information flow across these pieces is coupled, or "glued," together.

A pattern may be divided into multiple segments. For example, a pattern which aims to check on the price using a price comparison engine and then purchase the item, might be first divided up into two segments (one for the comparison and one for the purchase). The designer can eventually link the individual segments together while applying appropriate selection and transformation using scripts.

Device Editor View(s)

The Device Editor View(s) is a view where the designer is able to specify the view and interaction of the Client Devices as it relates to the pattern under design. For example, consider a pattern for retrieving bank account information. Within the Workplace and Pattern View, the designer is able to specify how to fetch the account information while navigating through multiple web screens. In the Device Editor, the designer may specify, for example, two screens: one in which the bank account number is entered and a second where the account balance is displayed. The Device Editor View is able to accommodate design for multiple classes of devices (e.g. phones, PDAs, etc.). Further, the Device Editor View(s) can function as the screen editors for specific clients, and can depict an accurate rendering of what the client device displays.

Script Editor View

Within the Script View, the designer is able to edit Javascript to manipulate the data flow within the pattern and also serve as gluing logic.

Utility Views

These are views used to enhance the user experience and provide useful information at various points. One Utility View is a Project Explorer. The Project Explorer displays all elements defined in the project thus far in a tree format. The main branches of the tree can include: Pattern (which contains all the states defined thus far in the Pattern View grouped into segments), Scripts (all scripts defined), and/or Session Data.

Another Utility View is a Data Explorer. Using the Data Explorer, the designer is able to create and inspect the data variables. These variables can be created for a give pattern and/or can be predefined and provided in a database of the mobilization program. The variables can be of basic data types but also can belong to User Defined data types that can also be created via this View. These variables are available to be used in different views.

A further Utility View is a Pattern Gallery, which displays a list of available patterns that can be re-used. Various properties of the patterns (inputs, outputs, description, last modification date, etc.) can be shown.

Replay Mode (Testing and Debugging)

According to one embodiment, once a pattern has been recorded, the IDT can be used to replay the pattern. This is critical for testing and debugging the pattern. The designer will have the ability to set breakpoints, step through the pattern and set up variable watch windows to trace the execution of the pattern. Since the pattern is interpreted, it may be possible to stop at a breakpoint, change the pattern that is supposed to follow, and re-start execution of the pattern.

IDT Output

According to an embodiment, the IDT can generate XML descriptions of the pattern called Pattern XML (or other suitable name), the mobile views generated and the data transformations, etc. designed within the data view. In addition, the scripts written by the designer are also recorded. The IDT also stores the current project in a binary document (uses MFC object serialization mechanisms), which has the information of the Pattern defined so far. The project file can be called "Company Process Document" (*.cpd files) or other suitable name.

More information about the IDT is provided in copending U.S. Patent Application entitled INTERFACE FOR MOBILIZING CONTENT AND TRANSACTIONS ON MULTIPLE CLASSES OF DEVICES, from which priority is claimed.

Figure 11:
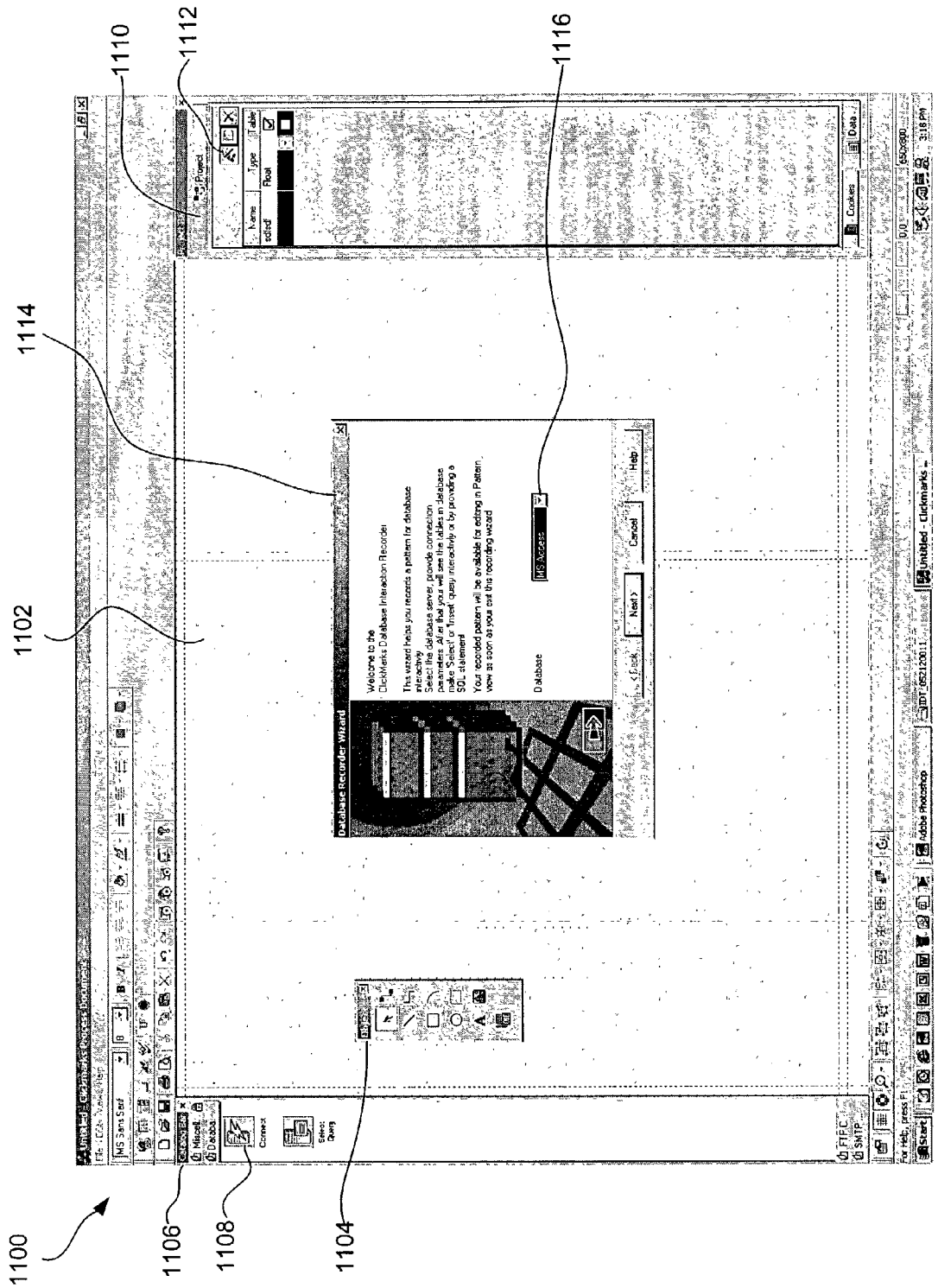
FIG. 11 illustrates a recording interface according to one embodiment.

FIG. 11 illustrates a recording interface 1100. As shown, a grid screen 1102 is provided. It is here that the graphical representation of an application for retrieving data from a data site is displayed. An Object Bar 1104 allows insertion of connectors and shapes into the grid screen. A Catalog Bar 1106 displays several types of specialized connectors and components. One specialized connector is the database connector 1108 representing a connection to a database. Selection of the tabs on the Catalog Bar displays different connectors and components. The items in these bars can be dragged and dropped into the grid screen and connected with connectors from the Object Bar. The Project Bar 1110 shows the names and types of variables being manipulated. Variables can be added by using a wizard, which starts upon selection of the wizard button 1112.

The following example illustrates creation of an application for retrieving a customer identifier (ID) from a database and creating an interface for displaying the customer ID on a particular type and/or model of device. As will be discussed in the example, the recording interface allows creation of different interfaces for different devices based on the capabilities of each.

Referring again to FIG. 11, a start screen 1114 is displayed upon selection of the wizard button. The database server is selected from the drop down menu 1116 and the Next button is selected. A database selection screen (not shown) is presented, which allows the user to select the desired database from which the desired data is to be retrieved.

Figure 12:
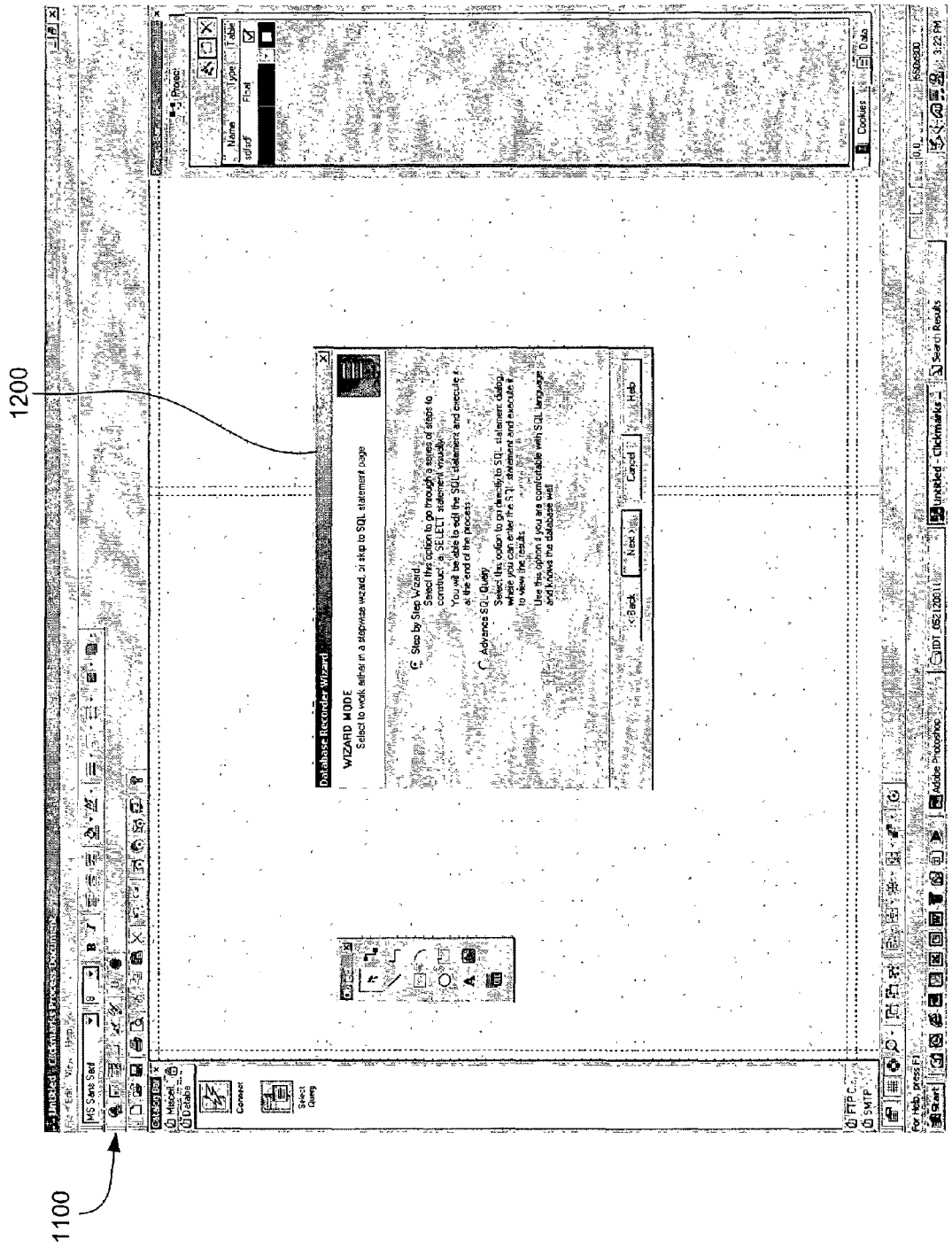
FIG. 12 illustrates a mode selection screen of the interface of FIG. 11.

FIG. 12 illustrates a mode selection screen 1200. Here, the user is allowed to select step by step mode or advanced mode. The desired mode is chosen and the Next button is selected. In this example, the step by step mode is shown.

Figure 13:
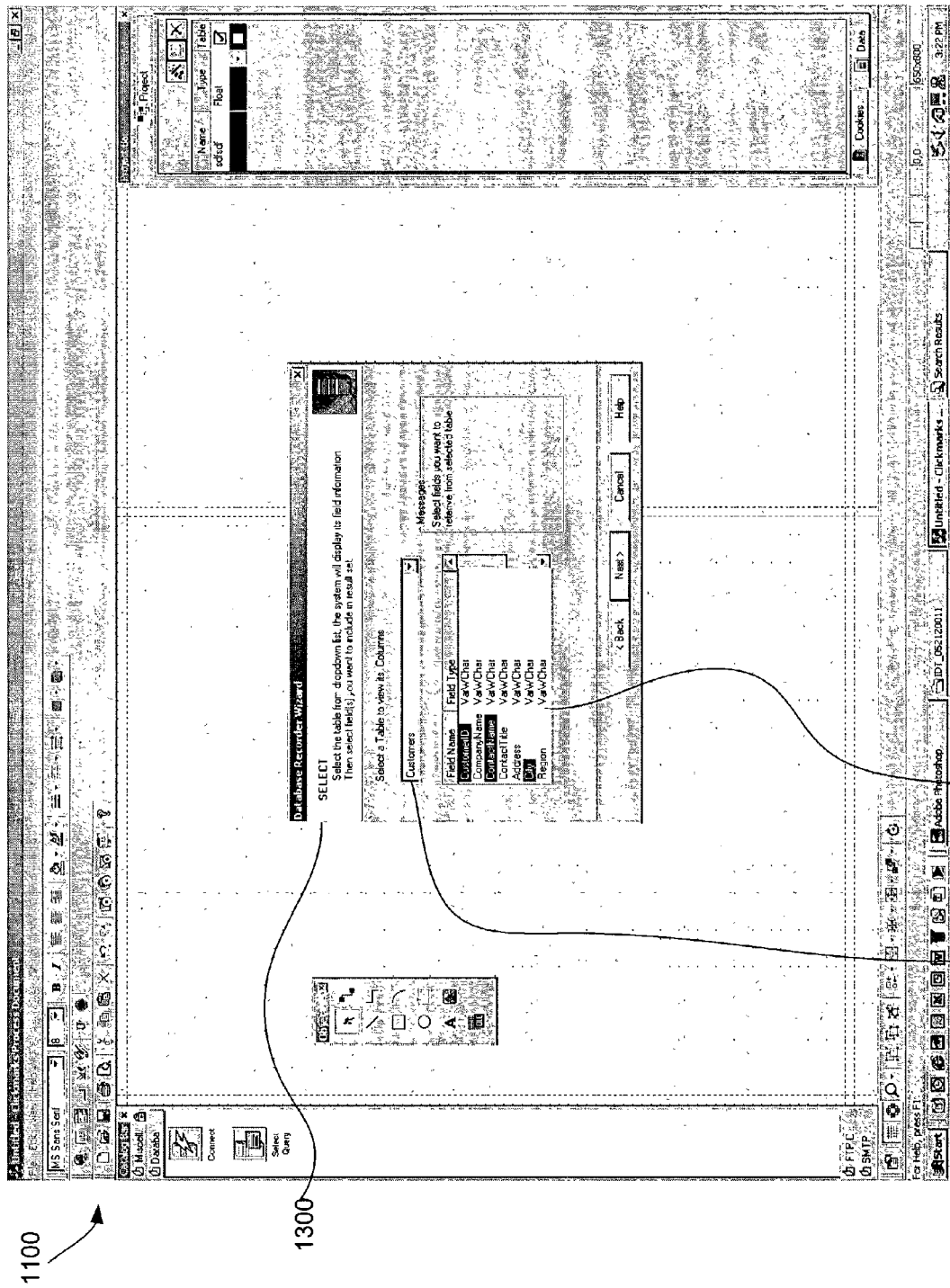
FIG. 13 shows a field selection screen of the interface of FIG. 11.

FIG. 13 shows a field selection screen 1300. The tables of the selected database are presented in the drop down menu 1302. The user is allowed to select which table to view. The fields of the selected table are presented in the fields display portion 1304. The user is allowed to select one or more fields from the field display portion. Note, multiple fields can be chosen using CTRL+R-click. The Next button is selected.

Figure 14:
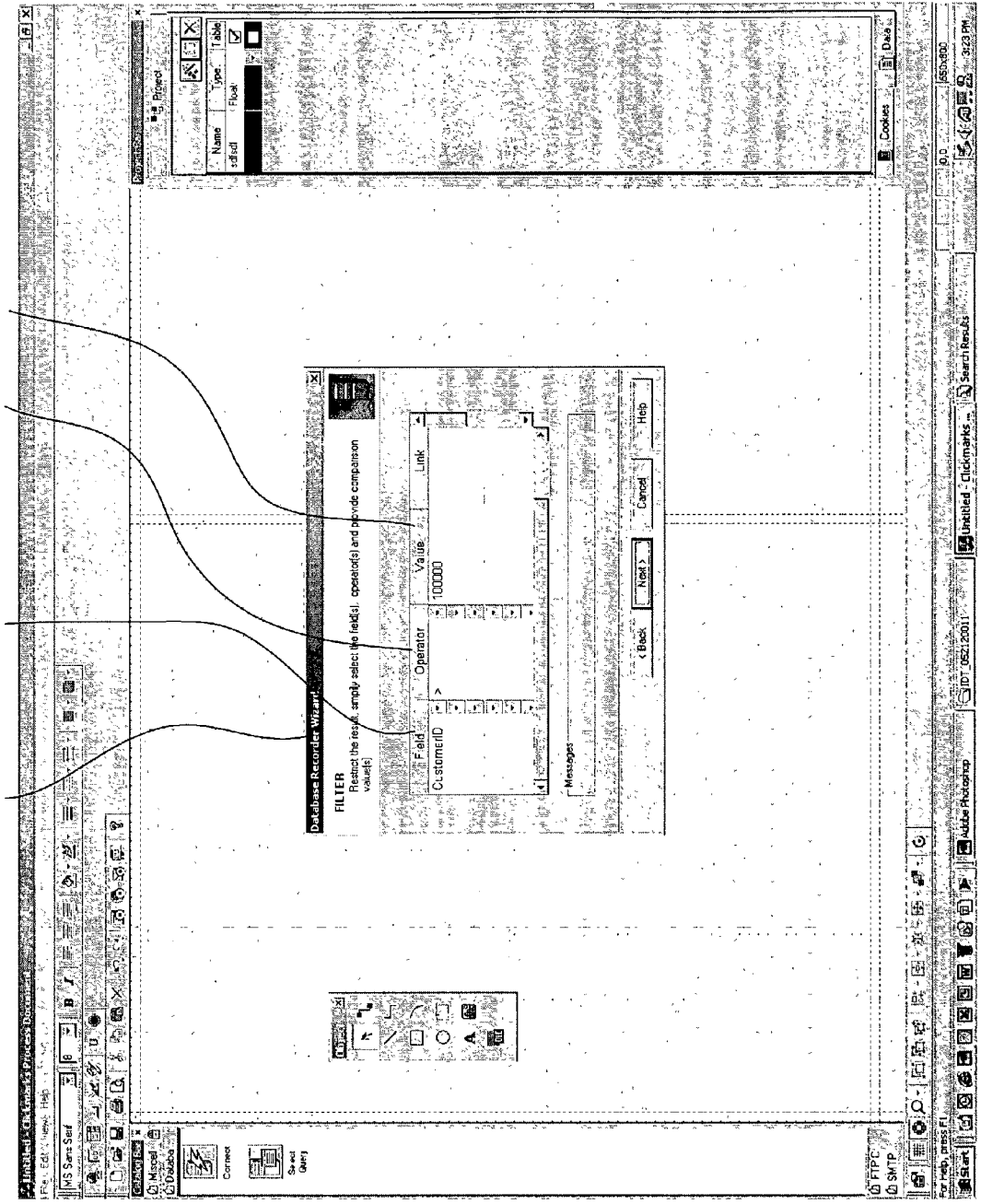
FIG. 14 depicts a filter screen of the interface of FIG. 11.

FIG. 14 depicts a filter screen 1400, which allows entry of filtering elements used to restrict the variables retrieved from the database. As shown, the field chosen in the field selection screen is displayed in the Field column 1402. Operands can be entered into the Operator column 1404 (or chosen from a drop down menu). Illustrative operands include >, <, $\geqq$, $\leqq$, and =. The Value column 1406 receives comparison values, to which the variables associated with the field are compared using the operand. The Next button is selected.

Figure 15:
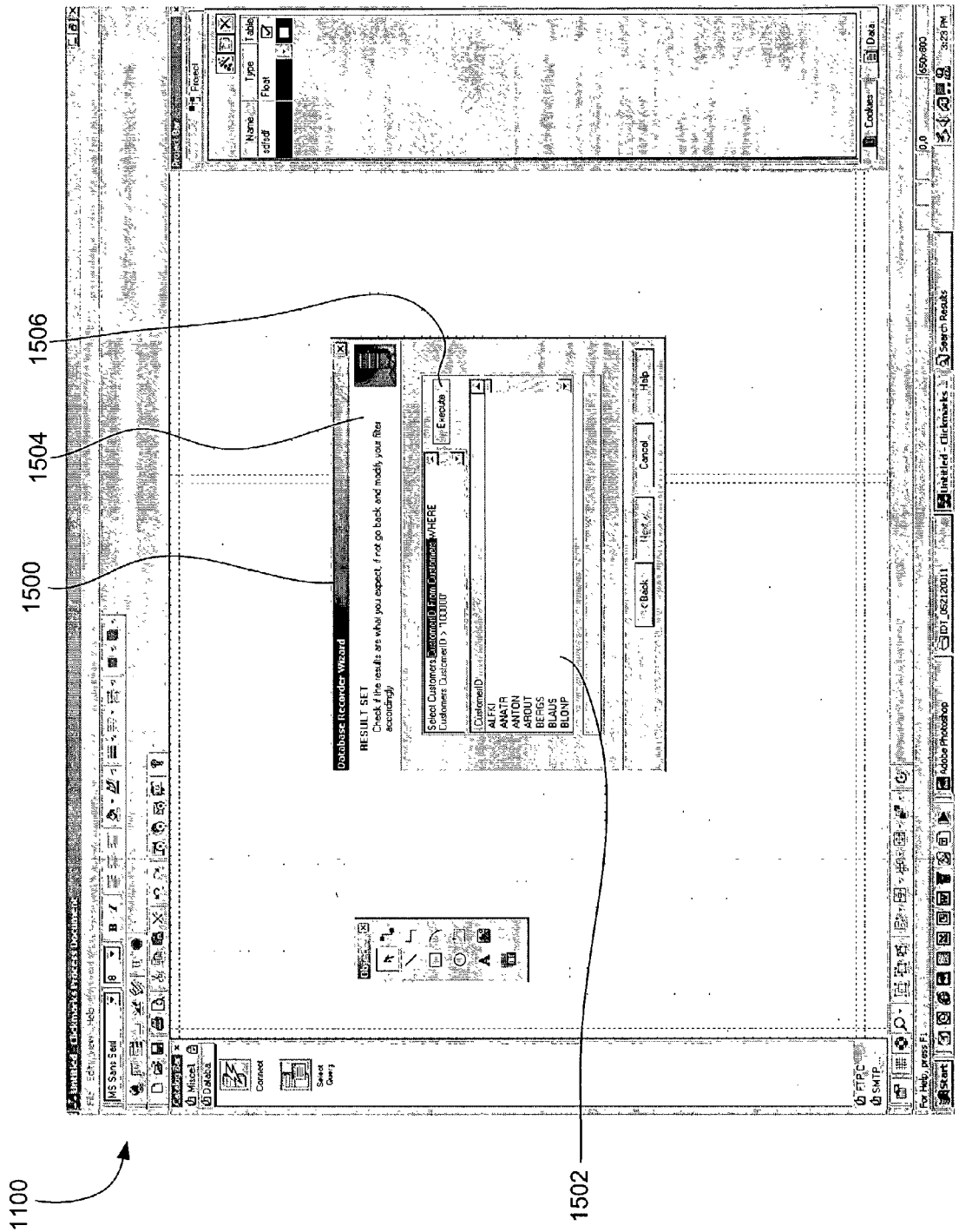
FIG. 15 illustrates a results screen of the interface of FIG. 11.

FIG. 15 illustrates a results screen 1500 displaying the results of the query in a results portion 1502. The query is also displayed in a query portion 1504. The query may be edited in the query portion to change the results returned. The Execute button 1506 is selected to re-execute the query and retrieve results of the edited query. The Next button is selected.

Figure 16:
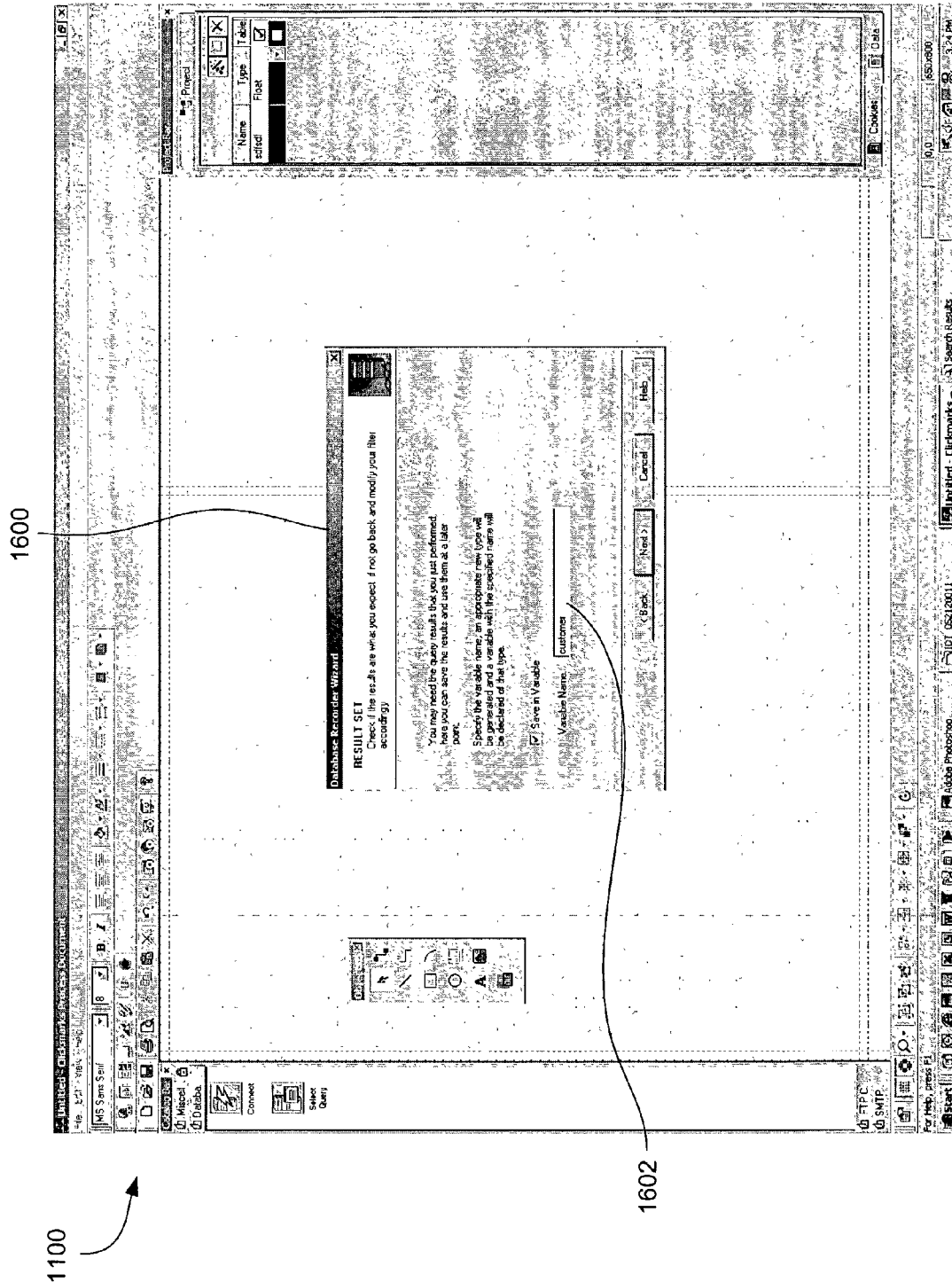
FIG. 16 illustrates an assign variable screen of the interface of FIG. 11.

FIG. 16 illustrates an assign variable screen 1600. Here, the results are assigned to a variable and saved for later use. The name of the variable is entered in the Variable Name field 1602. In this example, the variable is named "customer." The Next button is selected.

Figure 17:
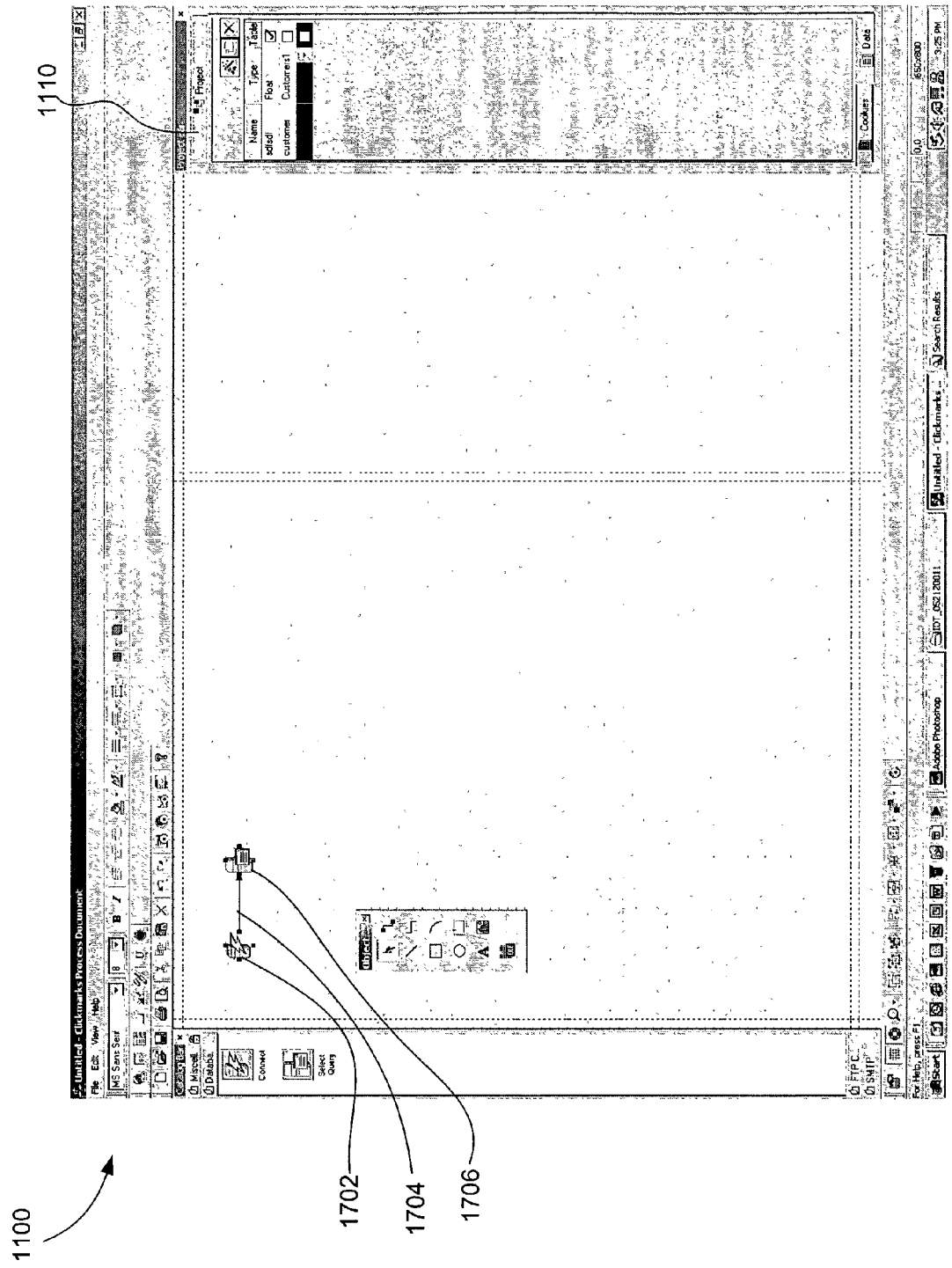
FIG. 17 shows the grid screen of the interface of FIG. 11.

FIG. 17 shows the grid screen 1100. The new variable "customer" now appears in the Project Bar 1110. A Database Connector 1702 is dragged from the Catalog Bar, as is a Select Query object 1704. A connector 1706 is dragged and dropped from the Object Bar to the grid screen and used to connect the Database Connector and the Select Query object.

Figure 18:
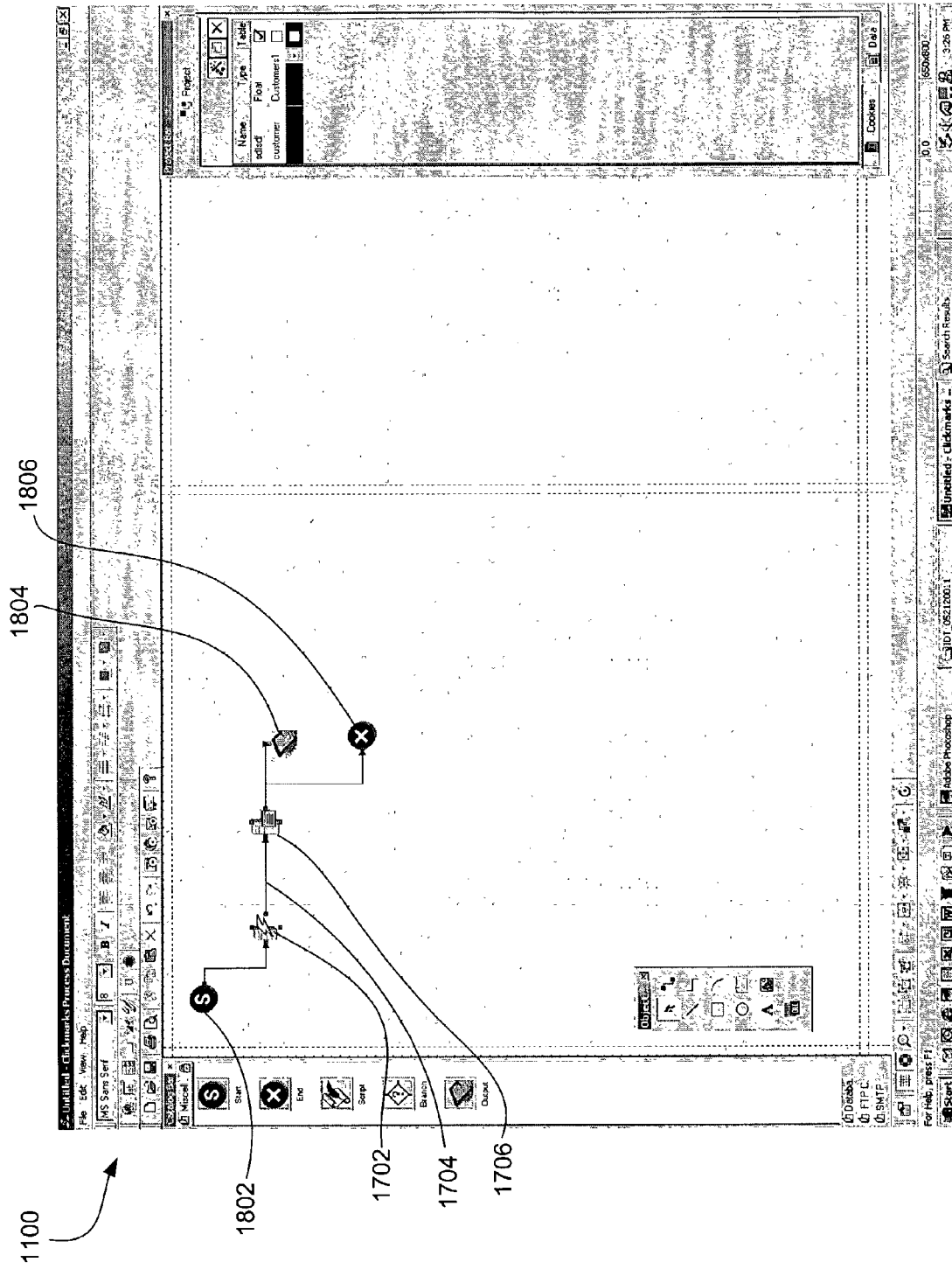
FIG. 18 shows the grid screen of FIG. 17 with additional objects added.

FIG. 18 shows the grid screen with additional objects added. Here, a Start Process object 1802, an Output object 1804, an End Process object 1806, and connectors have been added.

Figure 19:
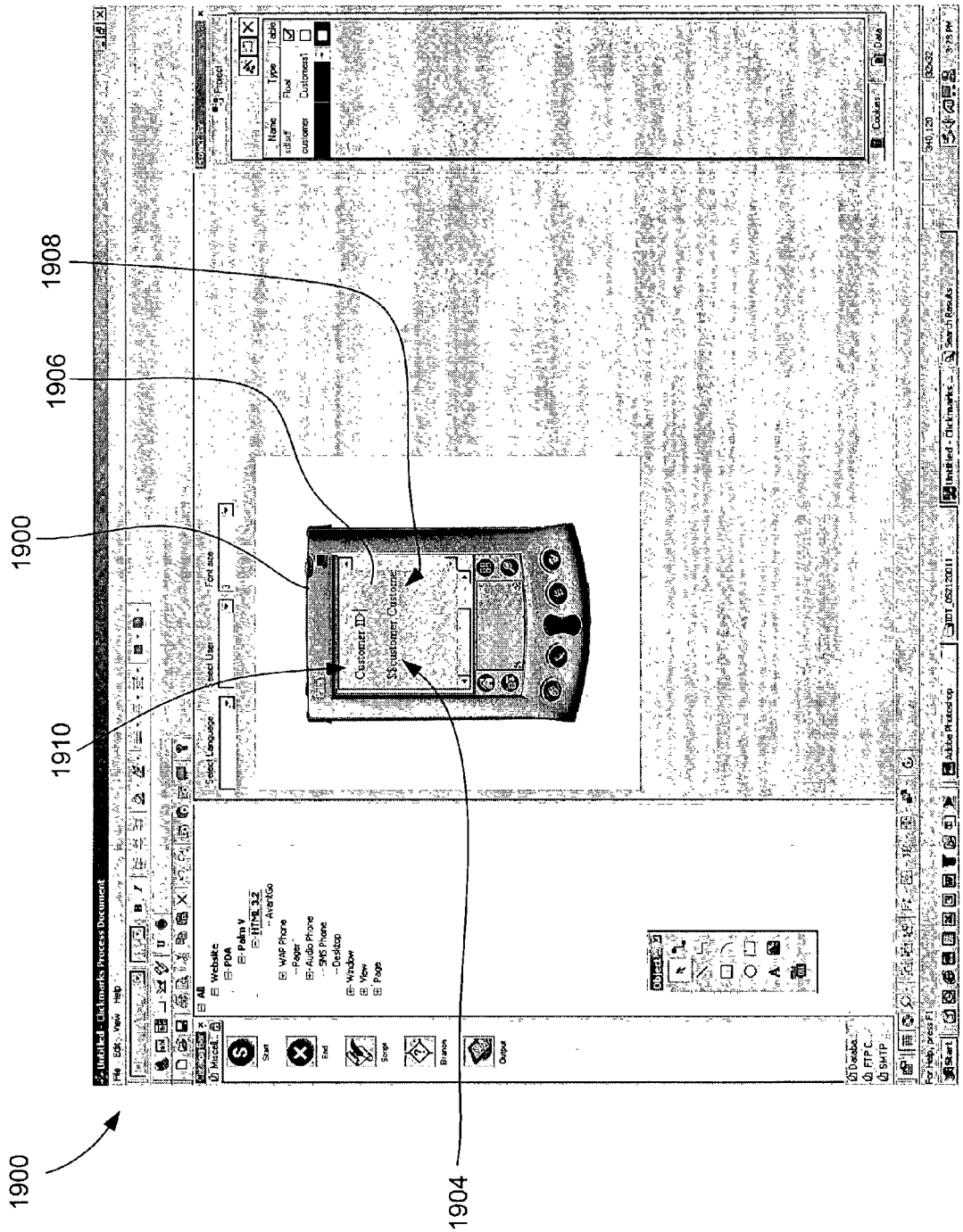
FIG. 19 illustrates a display specification screen of the interface of FIG. 11 from which the user can specify the manner in which variables are displayed on particular devices.

FIG. 19 illustrates a display specification screen 1900 from which the user can specify the manner in which variables are displayed on particular devices. As shown, various devices are shown in a tree structure. A type of device is selected, here the Palm V version of the PDA. A representation 1902 of the PDA is displayed. The identifier "customer" 1904 is added to the simulated display 1906 of the PDA. The variable field 1908 is also added to the display. During runtime, the actual result of the query is displayed in place of the identifier and variable field. Text may also be added for output in this screen. Here, the words "Customer ID:" 1910 have been added.

For example, a database program may have a table having an output with five columns. On a PDA, perhaps only four columns can be displayed on the display. The output can be set to show only four variables. Similarly, if only two columns of the table can be displayed on a phone, the output can be set to show only two variables.

Alternate Paths

The ability to specify alternate paths is especially useful for the XML Connector. The returned page may or may not be the 'expected' page, i.e. the page that the designer saw during recording, or it may be some different page. For example, during recording, the designer goes to a URL which is a login page, enters a Login/Password and can see the contents. During pattern replay, it is possible that the returned page after this interaction is a 'Server too busy' page. In such a situation, the designer may now want to retry for the password entry page.

To handle such a situation, the designer records the normal path using XML Connector Workplace and switches to Pattern View. From the 'Palette View', the designer drags and drops the XML Connector icon on the Pattern View. The designer links the login page node with this new connector node. The designer right-clicks the new connector node and selects 'Identify Page' from a pop-up menu. This invokes the XML Connector Workplace. The designer now browses to the alternate page and clicks 'identify'. Details for this identify operation are provided in U.S. Patent Application entitled SYSTEM, METHOD AND COMPUTER PROGRAM PRODUCT FOR RECOGNIZING A STATE OF A REMOTE APPLICATION, filed Aug. 28, 2001. under Ser. No. 09/942,263.

The workplace recording allows the designer to follow a given path in a linear fashion. Consider the scenario, of the XML Connector, where in a certain state there are choices for interactions (i.e. some links to choose from) that results in different outcomes. The designer desires to cover the alternate paths too. Even if the workplace only allowed recording in a linear fashion of a single scenario, the IDT would recognize a sub-pattern that is the "prefix" of an already recorded pattern, and if the designer revisits the workplace and starts recording again to reach the same state that matches a previously recorded pattern and then branches off to an alternate path, the workplace would still show a linear recording but the IDT would recognize the prefix and eventually insert the branching off from the prefix in the Pattern View.

Illustrative System Architecture for Pattern Replay

Figure 20:
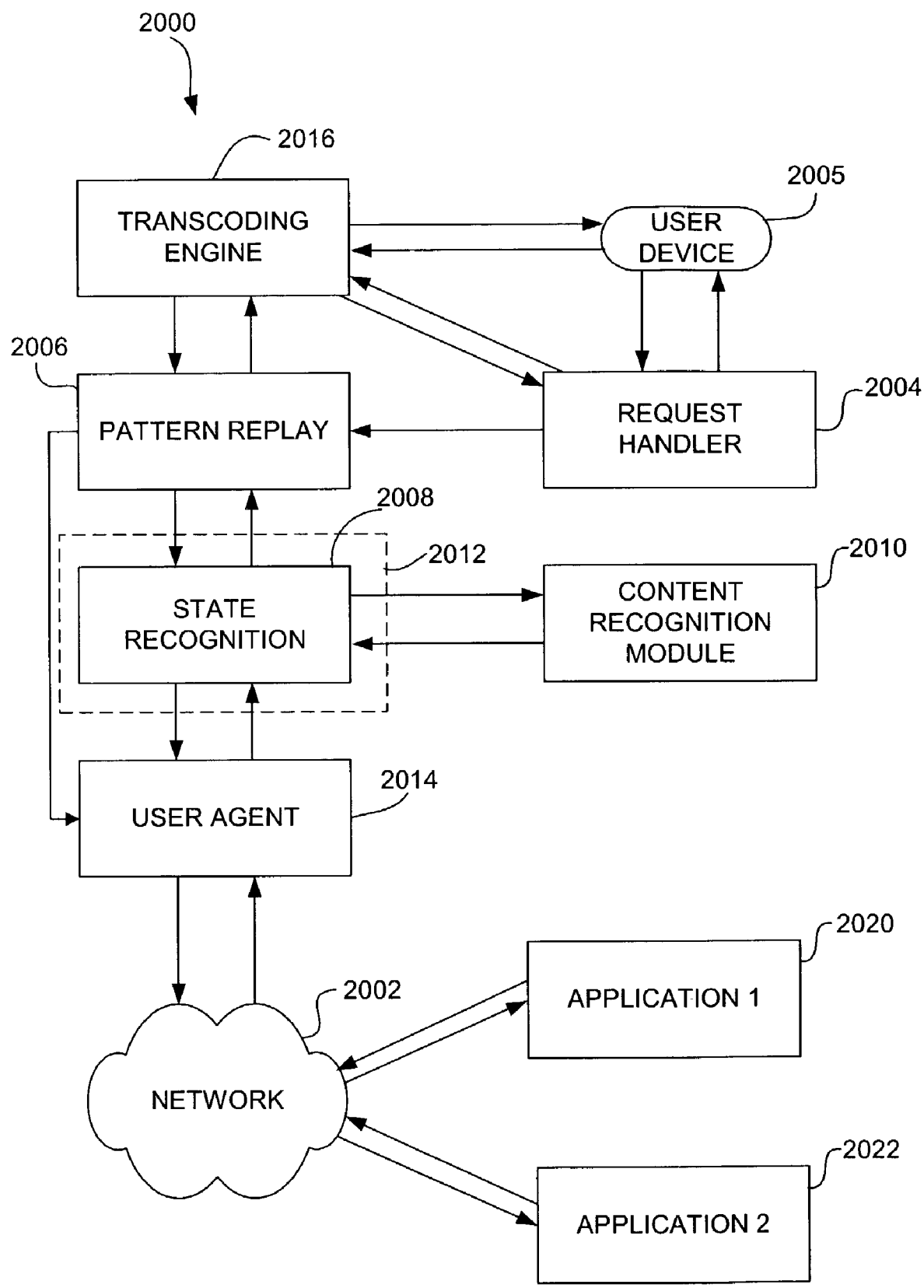
FIG. 20 illustrates an exemplary system for replaying a pattern using a network, in accordance with one embodiment.

FIG. 20 illustrates an exemplary system 2000 for replaying a pattern using a network 2002, in accordance with one embodiment of the present invention.

A Request Handler (RH) 2004 communicates with a user device 2005. The RH manages requests from the user device, routing them to the appropriate system component. When a user requests a transaction, the request is sent to a Pattern Replay Engine (PRE) 2006, which replays a pattern for conducting one or more transactions with other applications 2020, 2022 to provide functionality. More information about the PRE is set forth below.

The State Recognition Module (SRM) 2008 determines which state a website is in based on its current output, such as a structure of the current output. The SRM may communicate with a Content Recognition Module 2010, which recognizes individual documents that can comprise a state.

A Connector 2012 is in communication with the SRM. The Connector executes a state in the pattern.

The User Agent 2014 is used by other components of the system to provide the actual interaction with a remote application. For example, when replaying a pattern, the SRM communicates with the User Agent via the Connector to provide instructions to the User Agent. The other system components have intelligence built into them that instructs them how to utilize the User Agent. For example, when a user clicks on a button on a page, other components instruct the User Agent to navigate to the desired application and perform some action, such as filling in a form. The User Agent retrieves the resulting output from the application and returns it to the other components.

By default, the User Agent is not running. A listener (not shown) listens for requests. When the listener receives a request, it creates a new User Agent process on the server and returns an identifier that identifies the User Agent process. Subsequently, client processes use the identifier, go to the specific User Agent and instruct it to perform some action. The User Agent performs the action according to the instructions and returns the results of the action.

Content is retrieved from a remote application and is sent to a specific device in a format suitable for that device. The formatting is done by another module, namely, the Transcoding Page Rendering Engine (TRE). A Content Retrieval Module (CRM) (not shown) retrieves the content as an XML stream for use by the other system components. Components that directly use the CRM are the State Recognition Module (SRM) and the Interactive Development Tool (IDT). More information about operation and functionality of the Content Retrieval Module is found in copending U.S. Patent Application entitled SYSTEM, METHOD AND COMPUTER PROGRAM PRODUCT FOR RETRIEVING ARBITRARY CONTENT FROM A REMOTE DATA SITE FOR OUTPUT TO A DEVICE IN A FORMAT SUITABLE FOR THAT DEVICE, filed Aug. 28, 2001. under Ser. No. 09/942,262, which is herein incorporated by reference.

The Transcoding Page Rending Engine (TRE) 2016 renders content for display on the user device. Preferably, the TRE is able to render content on any display environment.

Pattern Replay Engine (PRE) 2006

The Pattern Replay Engine (PRE) is a component that is responsible for replaying a pattern from one particular state to another during runtime.

Figure 21:
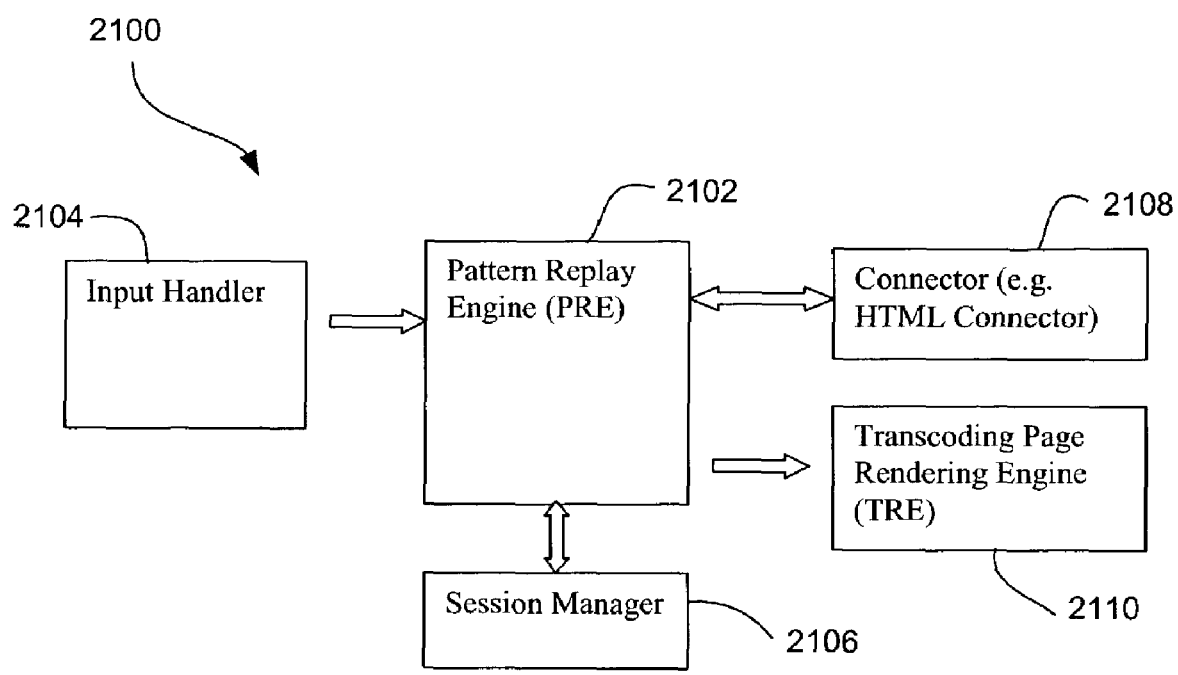
FIG. 21 is a drawing showing a general overview of how a pattern replay engine interfaces with other major components of the system according to one embodiment.

FIG. 21 gives a general overview of how the PRE 2006 interfaces with other major components including the Input Handler 2104, session manager 2106, connector 2108, and TRE 2110.

The PRE is a request-driven component. The PRE takes the request to make a transition from a particular State. Transitions from one State to another are made by executing Actions. The PRE communicates with the appropriate Connector (of the current State) to execute the current Action in the request and get the new resulting State. Next, all Script associated with the State is evaluated.

The PRE then calls the Transcoding Page Rendering Engine (TRE) to "flush" its output to the device. This means that any Content, which has been queued for display in the TRE (while processing the request), is sent to the device. Every state can potentially generate output to be displayed on the device, including internal states. This is a desirable feature as it means the designer can send a status message to the device, e.g. "Please wait while processing . . . " etc. Finally, a script is called, which can initiate further State transitions from this script method if necessary.

More information about operation and functionality of the PRE is found in U.S. Patent Application entitled SYSTEM, METHOD AND COMPUTER PROGRAM PRODUCT FOR PATTERN REPLAY USING STATE RECOGNITION, from which priority is claimed.

Transcoding Page Rendering Engine (TRE) 2016

The Transcoding Page Rendering Engine (TRE) is a tool used to render content on any display environment.

Figure 22:
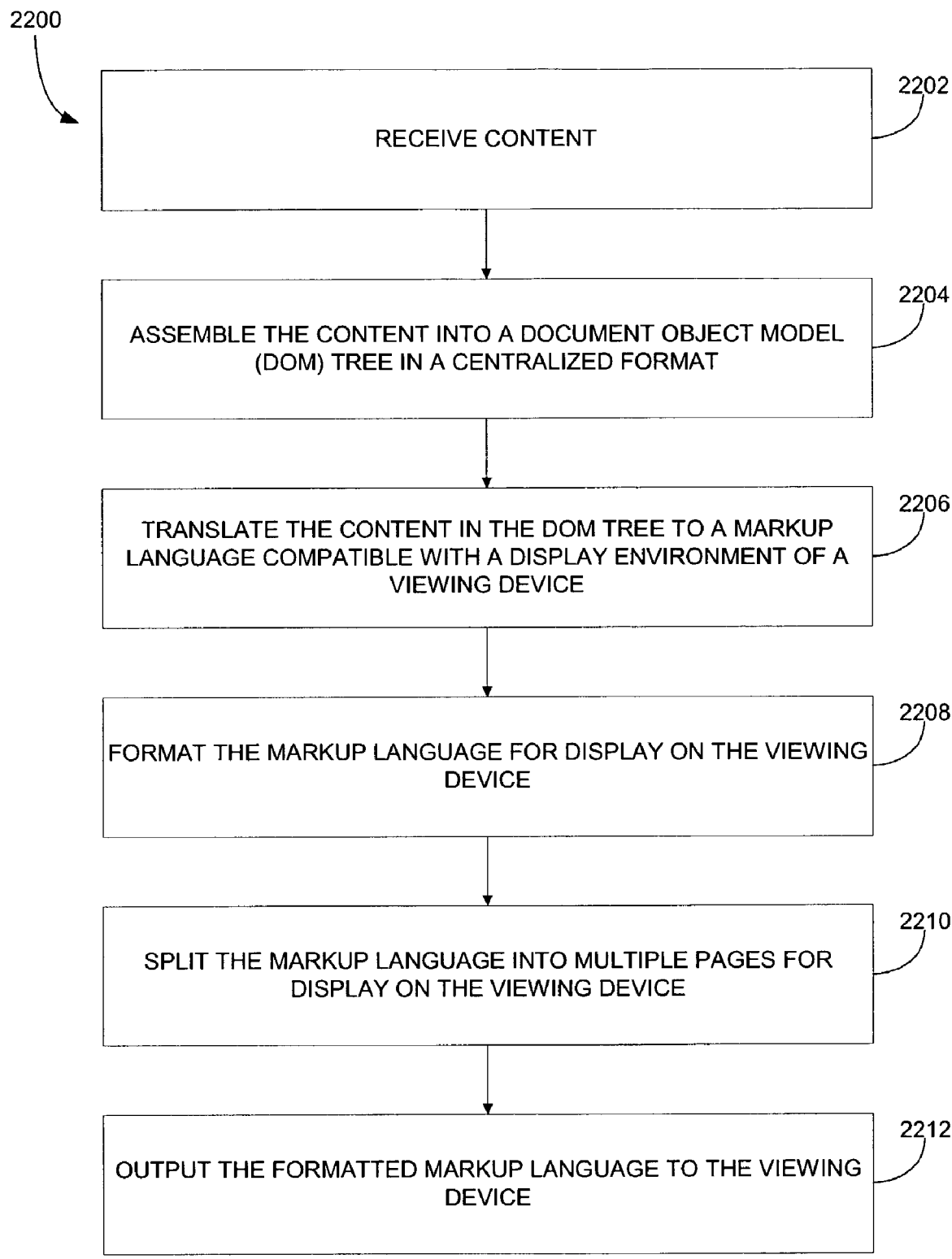
FIG. 22 is a flowchart of a transcoding process for rendering arbitrary content for display on a particular viewing device according to a preferred embodiment.

FIG. 22 is a flowchart of the TRE process 2200 for rendering arbitrary content for display on a particular viewing device according to a preferred embodiment of the present invention. In operation 2202, content is received. In operation 2204, the content is built into a DOM tree in an extended version of XHTML, referred to herein as CXHTML. Note that CXHTML is used herein by way of example only, and any suitable format can be used. For example, the format can be any XML form. This DOM tree is then processed in operation 2206 by several modules which translate the CXHTML into an appropriate markup language for the viewing environment and format this markup language to display best on the viewing device in operation 2208, which may include splitting the markup language into multiple pages. Note operation 2210. The markup language representation of the content can also be translated into the user's native language and/or character set. In operation 2212, the content is output to the viewing device.

Note that the TRE can process other types of output, such as audio, etc.

More information about operation and functionality of the TRE is found in U.S. Patent Application entitled SYSTEM, METHOD AND COMPUTER PROGRAM PRODUCT FOR PAGE RENDERING UTILIZING TRANSCODING, filed non-provisionally Aug. 28, 2001. under Ser. No. 09/942, 051. and assigned to common assignee Clickmarks, Inc., and which is herein incorporated by reference.

Pervasive Computing Through Interaction Level Programming

Interaction Level Programming (ILP)—Interaction Level Programming is the act of creating a software application, using the user-interface (UI) of another program as the Application Program Interface (API). Because many applications that do not expose an API, do expose a UI, ILP allows many more applications to be re-factored into e.g. mobile applications, web applications, and web services. ILP effectively turns the application UI into an API.

Visual Interaction Level Programming (VILP)—Visual ILP is the act of visually creating a program using the UI of another application. The programmer interacts with the application via the application's user interface as they normally would. In addition, the programmer visually instructs the ILP system what actions to carry out, and what UI elements to extract from the application. The user's interactions are recorded by a tool such as the IDT described above. The recorded interactions may then be replayed.

When replayed by the ILP system, the resulting program carries out the specified actions against the application's user interface, and exposes the specified UI elements to the program for use in its user interface.

For clarity, the present discussion will refer primarily to ILP, it being understood that the discussion applies equally to VILP.

The new application created via ILP can expose different interfaces, including user interfaces, and/or programming interfaces (API), allowing the new application to be used in completely new environments and computing systems. For example, ILP could be applied to an IBM 3270. mainframe application, to create a new application that allows mobile users to enter information into the 3270. application from their web-enabled cell phones. All this is done without changing the original 3270. application in any way whatsoever, thus providing complete flexibility in integrating different applications together without having to modify said applications.

Finite State Machine

According to a preferred embodiment, ILP works by modeling the application as a finite state machine (FSM), where each state is the UI presented by the application at a given time. Transitions between states are made by performing a sequence of actions on the UI, known as an event stream. The exact definition of a state in the FSM is determined by the ILP programmer.

A state in the FSM is defined by the UI elements present in the UI of the application at a given point in time. The presence of UI elements can be given different weights, thus allowing slightly different UI screens to be treated as the same state by the ILP system. This flexibility allows the user to simplify the FSM, as it does not need to contain as many states as there are different UI screens. For example, two UI screens that differ only in background color can be represented as the same state in the FSM.

State Recognition

The ILP system recognizes at runtime what state in the FSM the application is actually in. The state is recognized using a heuristic search that computes the recognition score of each possible state based on the weighted presence or absence of UI elements in the application. For example, suppose that after a given transition, the FSM could be in potentially one of 2. states. In one state, a certain UI element, say a button, must be present for the FSM to be in that state. In the other state, that same button must not be present. Thus the system evaluates the recognition score for each state, and picks the best one, in this case, depending on whether or not the button is present.

State recognition is important, because it allows for tremendous flexibility in constructing the FSM. For example, suppose that in a certain state, the user is expected to enter a text value into an entry field, and then press a submit button. 99% of the time, the application ends up in state A upon pressing the button. But if the user enters a certain value in the entry field, the application ends up in state B instead. These states may be very different from each other. For example, consider a simple login form in a typical web application. If the user enters the correct user name and password she is taken to a page displaying some personal information. If not, the user is prompted to try again for a few times, and after that is told that they must contact technical support. In all cases the user carries out the same actions (enter username and password, press submit) but ends up in 3. potentially different states. Because the logic of which state the user will end up is embedded in the application, there is no easy way to express this fact when constructing an external model of the application. Instead, the model simply indicates that pressing the submit button in the login state can lead to 3. possible states. Which of the states was actually reached is determined at runtime by the ILP system.

Performing Actions on a State

Once the system determines what FSM state it is in, it carries out the actions defined for that state, and if the actions result in a state transition, it again recognizes the FSM state, and so on. The actions that can be performed on a given state are:

Send UI events to the application (e.g. push button 1, enter a value into field 2, etc.). Extract UI elements from the application (e.g. extract an HTML table from a website). Create UI widgets tied back to the application (e.g. create a form widget that corresponds to a form in the application).

Together, these actions allow the user of the ILP system to create a new application or "program" that derives part or all of its functionality from the original application.

Figure 23:
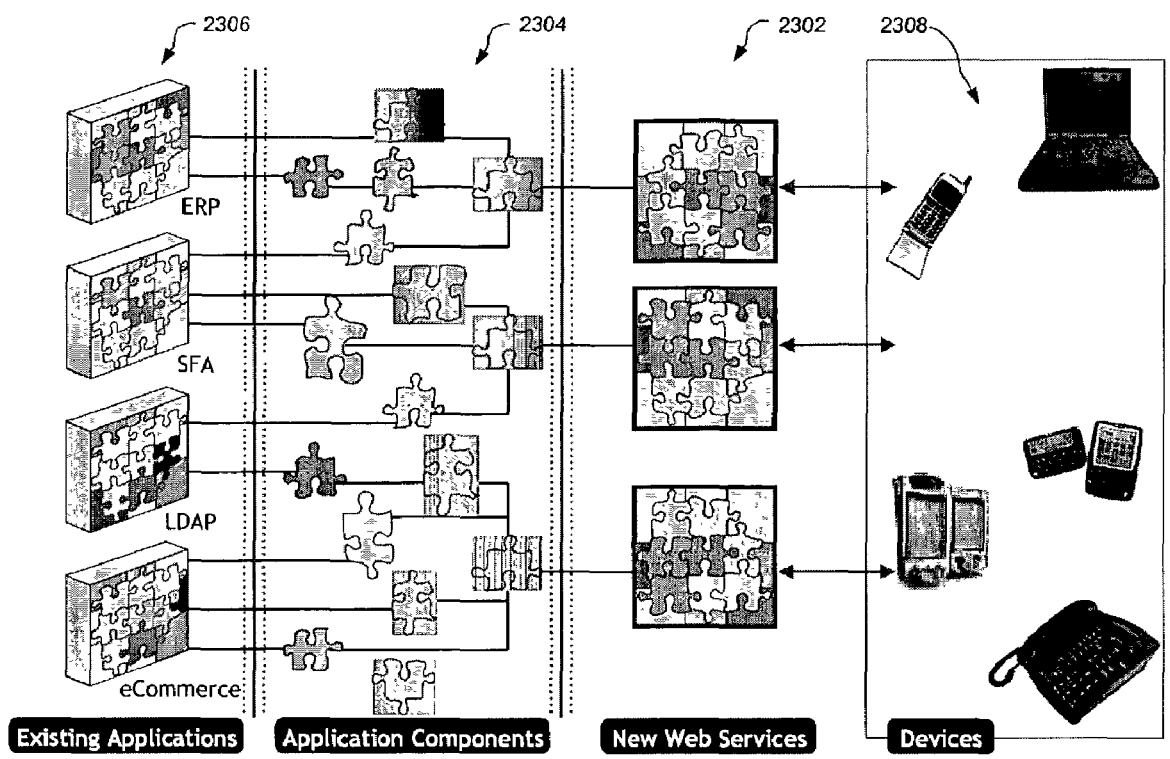
FIG. 23 is a flowchart depicting generation of new applications according to one embodiment.

FIG. 23 is a flowchart depicting generation of new applications 2302 according to one embodiment. Using the IDT described above and the various system components set forth in FIG. 20 and the related discussion, a developer is able to stitch together components 2304 of existing applications 2306, including web applications, web services, legacy applications, enterprise applications, mainframe applications, WINDOWS® applications, and a JAVA® applications and is also able to add new application functionality using a variety of programming languages including Java, JavaScript and SQL, all using a visual paradigm that allows the application to be built very quickly. Using an intuitive user interface, the developer can publish the new application as a web service, accessible via HTTP, Simple Object Access Protocol (SOAP—described below), etc. through a centralized server. The newly developed application can be made accessible on multiple devices 2308 via any type of network, wireless or Internet connection.

This process allows the application to be created quickly without requiring the developer to spend days and weeks writing code for a new application. Rather, using the processes set forth herein, selected portions of applications in an existing infrastructure can be reused to provide new functionality and applications. The developer simply interacts with the existing applications and those interactions are recorded to capture the resulting functionality. The developer no longer needs to code to API's. Rather, the methodology presented herein goes above API's, to the interaction level, thus making it easier to call the functionality of the existing infrastructure.

Figure 24:
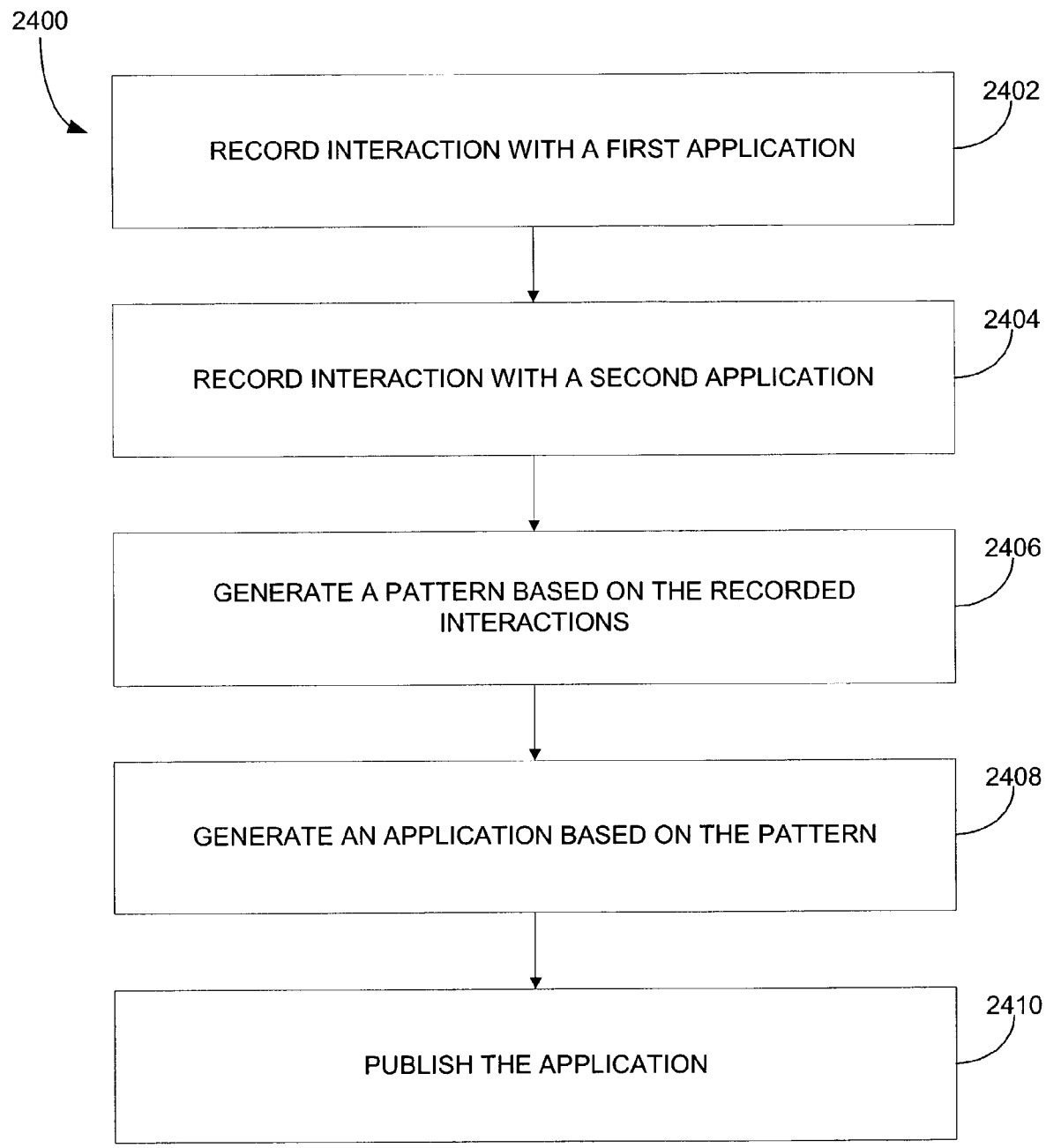
FIG. 24 is a flow diagram of a process for generating an application according to one embodiment.

FIG. 24 is a flow diagram of a process 2400 for generating an application via ILP according to one embodiment. An interaction with a first application, preferably at the user-interface level, is recorded in operation 2402 for capturing a functionality of the first application. The applications can be any type of application in existence. In operation 2404, an interaction with a second application is also recorded for capturing a functionality of the second application. Note that the interactions may be user interactions, interactions by other applications, etc. A pattern is generated in operation 2406 based on the recorded interactions. The pattern can be saved in memory such as in a file on a hard disk.

When recording the interaction with one or more of the applications, an interface can be displayed to allow a user to specify interactions with the application(s) via the interface. The user interactions are recorded and become part of the pattern as the user interacts.

In operation 2408, an application is generated based on the pattern. The interactions recorded in the pattern are repeated upon replay of the pattern for providing the functionalities of the first and second applications. In optional operation 2410, the application is published as a network service accessible via the Internet, an intranet, or other network.

Figure 25:
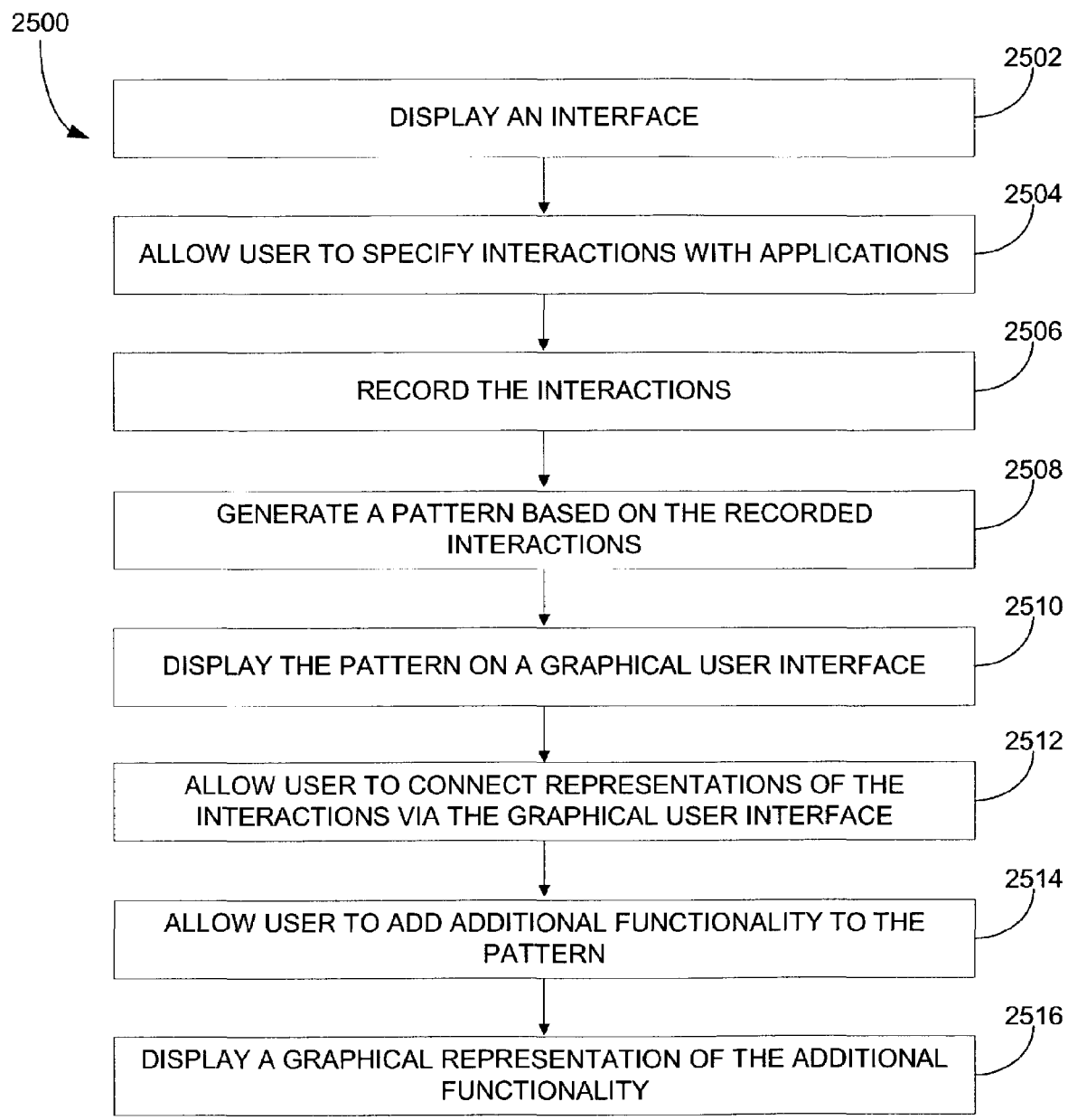
FIG. 25 is a flow diagram depicting a process for creating an application utilizing a graphical user interface in accordance with an embodiment.

FIG. 25 is a flow diagram depicting a process 2500 for creating an application via VILP utilizing a graphical user interface. In operation 2502, an interface is displayed. A user is allowed to specify interactions with multiple applications via the interface in operation 2504. These interactions are recorded in operation 2506. In operation 2508, a pattern is generated based on the recorded interactions. The pattern is displayed on a graphical user interface in operation 2510. The pattern includes a graphical representation of each interaction. Such graphical representation can be an icon, etc. See FIGS. 11-19 and related discussion for more details regarding graphical representations. In operation 2512, the user is allowed to connect representations of the interactions via the graphical user interface for specifying an order of execution of the interactions in the pattern.

With continued reference to FIG. 25, the user is allowed to add additional functionality to the pattern in operation 2514. In operation 2516, a graphical representation of the additional functionality is displayed on the graphical user interface. Thus, by creating a pattern with recorded interactions and additional functionality, a developer has created an application that can be used and reused.

As an option, the pattern can include prerecorded interactions. Thus, previously recorded interactions can be used as "building blocks" for the new application, thereby avoiding the need to re-record the interaction. They are merely retrieved from storage and added to the pattern to provide functionality.

As another option, the pattern can be coupled to another pattern to provide additional functionality. The other pattern can be a previously created pattern that has been stored or another pattern created jointly.

Preferably, output relating to the pattern can be specified for multiple client devices. This can include specifying which output is actually sent to a particular type of device, as well as the format of the output for particular types of devices.

Figure 26:
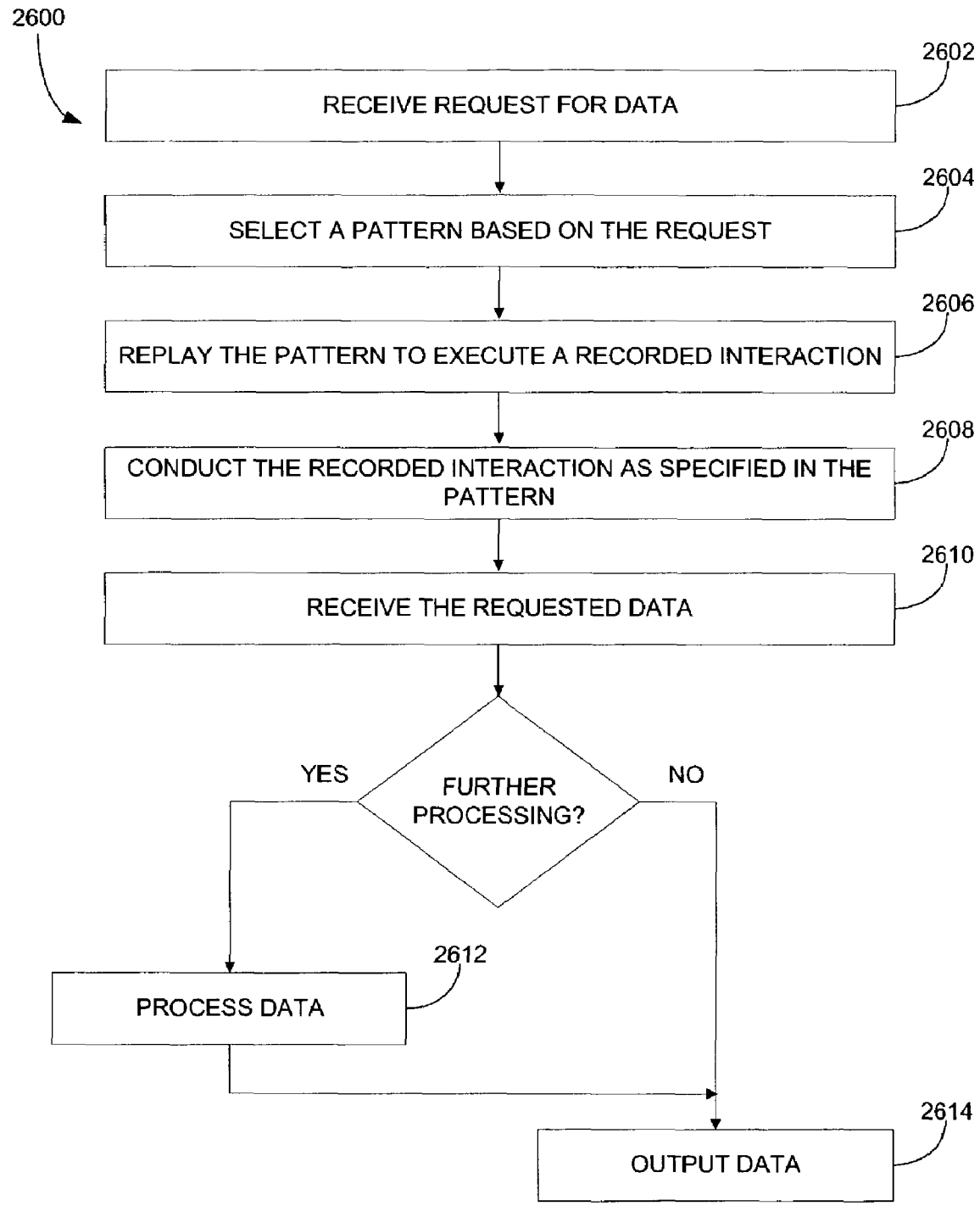
FIG. 26 provides a flow of execution of the pattern-based application.

Once the application has been created, the pattern-based application can be executed. FIG. 26 provides a flow of execution 2600 of the pattern-based application. Upon receiving a request for data from a user or another application in operation 2602, a pattern for retrieving the requested data is selected in operation 2604 based on stored information associating the pattern with the desired functionality required to obtain the requested data. The pattern has stored therein a recorded interaction with at least one external application. The interaction accesses the functionality of the external application, thereby permitting data to be obtained from the external application. In operation 2606, the pattern is replayed to execute the recorded interaction. In operation 2608, the recorded interaction is conducted as specified in the pattern for obtaining the requested data. The requested data is received in operation 2610. The received data can be further processed and/or output. Note operations 2612 and 2614. For example, the received data can then be processed for output on a particular type of device as specified in the pattern, and/or can be processed for output on multiple types of devices such as a desktop computer, a wireless telephone, a PDA, and/or any other type of device. This can be done by transcoding the output as described above.

EXAMPLE

Consider the following example of a logistics application. A company is currently using the following system. A truck driver delivers goods and notes the delivery on a sheet, returns to headquarters, and gives sheet to data entry. If there were problems or he was unable to deliver the goods, he writes the details on the sheet and data entry sends an email to a manager.

The company wants to automate this process. The desired application is to have the following parameters. The driver is to be given a PDA or voice phone (for communicating via a voice portal, as described in copending U.S. Patent Application entitled VOICE APPLICATIONS AND VOICE-BASED INTERFACE, filed Sep. 14, 2001. under Ser. No. 09/952,909, and which is herein incorporated by reference). The driver is to enter a status or problem via the PDA or voice phone. The information is either entered in database, or sent to report generation, which creates a report and sends it to a manager. The manager is to be able to check status/reports on a desktop.

To perform all of these functions, the application must interface with a backend resource management system (how company resources are being used), and go into a customer management system (customer database) to see if the customer is not available at a particular delivery time or has billing issues. The application must also be able to communicate with the driver's device, whether connected or disconnected. Also, the application must be capable of generating an alert to the manager.

To create such a pervasive application in the prior art method, the developer must learn about and write code for the PDA (Palm Pilot, etc). Code must also be written to handle the transactions that occur when the driver interacts and his data comes to the application on the server. A connection to the databases must be opened and the driver's communications written in. Further, the developer must write code that checks for exceptions written by someone (for example, if delivery doesn't happen by this time, send alert) via an administrative interface created by someone. Then if someone (manager) wants to log on through a desktop, the developer must create an interface for that too. Thus, the developer has to write a lot of software.

According to the methodology presented herein, a pervasive application connecting all of these applications and devices can be quickly built and implemented. Using the IDT, the developer merely needs to interact with the various devices and programs. The IDT captures the interactions, which are then used to create a pattern or patterns.

A form presented on the PDA can be generated using the publisher for mobile devices described in U.S. Patent Application entitled SYSTEM, METHOD AND COMPUTER PROGRAM PRODUCT FOR A CONTENT PUBLISHER FOR WIRELESS DEVICES filed Jul. 10, 2001. under Ser. No. 09/902,929, and which is herein incorporated by reference. The driver can enter information on the form, which is transmitted to the new application via an existing communications program. The developer interacts with the existing communications program in such a way that the desired data is obtained. The developer's interaction is recorded and placed in a pattern, as described above. Upon replay of the pattern, the desired data is again retrieved. See FIGS. 11-19 for a description of capturing interactions with databases. To create the alerts, the developer interacts with an email program, entering delivery and content information. Again, this interaction is recorded and placed in the pattern. The developer is then able to set criteria for which alert is sent upon receipt of information from the driver.

Transaction Object Model (TOM)

One embodiment allows developers to create transaction objects, which they can use as building blocks to create applications. In sharp contrast to the prior art, the methodology set forth herein overcome the "fixed menu" drawback of prior art systems and allows a developer to use any existing functionality by capturing it in a pattern.

Any software application can be seen as a set of functional flows. Each transaction can be seen as a transaction object. The transaction objects are captured and converted into building blocks that a developer can use and reuse. The developer no longer needs to select from a predefined set of building blocks, but can capture the blocks from any application. Now, the entire universe of applications provides building blocks. Any portion of any application by anyone can become a building block.

The developer selects the desired blocks and writes some code around the block (if necessary) to create a new application. Further, the system is flexible, allowing the developer to add and remove blocks at will.

Simple Object Access Protocol (SOAP) is a way for a program running in one kind of operating system (such as Windows 2000) to communicate with a program in the same or another kind of an operating system (such as Linux) by using the World Wide Web's Hypertext Transfer Protocol (HTTP) and its Extensible Markup Language (XML) as the mechanisms for information exchange. Since Web protocols are installed and available for use by all major operating system platforms, HTTP and XML provide an already at-hand solution to the problem of how programs running under different operating systems in a network can communicate with each other. SOAP specifies exactly how to encode an HTTP header and an XML file so that a program in one computer can call a program in another computer and pass it information. It also specifies how the called program can return a response.

SOAP was developed by Microsoft, DevelopMentor, and Userland Software and has been proposed as a standard interface to the Internet Engineering Task Force (IETF). It is somewhat similar to the Internet Inter-ORB Protocol (IIOP), a protocol that is part of the Common Object Request Broker Architecture (CORBA). Sun Microsystems' Remote Method Invocation (RMI) is a similar client/server interprogram protocol between programs written in Java.

An advantage of SOAP is that program calls are much more likely to get through firewall servers that screen out requests other than those for known applications (through the designated port mechanism). Since HTTP requests are usually allowed through firewalls, programs using SOAP to communicate can be sure that they can communicate with programs anywhere.

System Architecture

Figure 27:
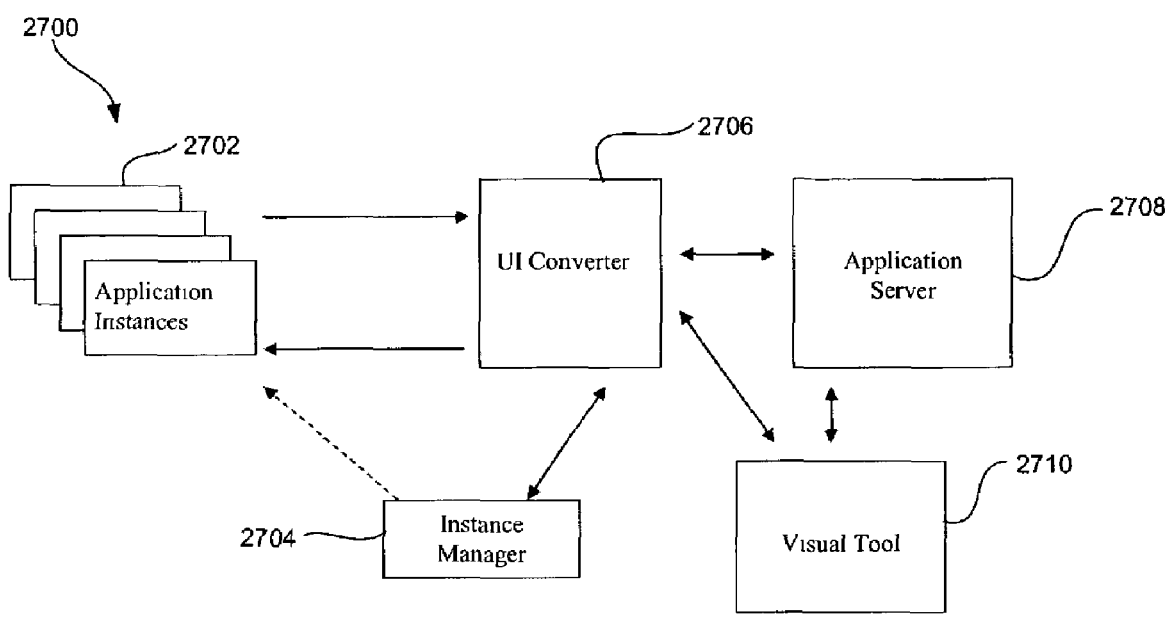
FIG. 27 is a system architecture diagram according to one embodiment.

FIG. 27 is a diagram of a system architecture 2700 according to a preferred embodiment. The system according to this embodiment includes the following components, each of which is discussed in greater detail below. One component is a pool of Application Instances 2702. These represent the application being programmed. Another component is an Instance Manager 2704, which manages a potentially reusable pool of application instances. A UI Converter 2706 translates the current state of the application's UI into an internal representation for processing. An Application Server 2708 receives instructions to record at design time, and replays these instructions at runtime. A Visual Tool 2710 renders the application UI so that the designer can visually program the application.

Application Instances 2702

Each application instance represents an interactive session, generally corresponding to a single user of the ILP application. Note that in client-server applications, only multiple client instances are needed. Each application instance can be a pattern, as described above.

Instance Manager 2704

The Instance Manager (IM) allows the system to scale to a large number of simultaneous users. For each user interaction, the system requests an application instance from the IM. Because application instances may be expensive (generally an entire operating system process is required for each instance) the IM may implement instance pooling, where application instances are re-used across users. The IM preferably separates instances so that instances do not pollute each other.

UI Converter 2706

The UI Converter (UIC) takes a "snapshot," of the application's UI state, and converts it to a representation that is used for state recognition. The "snapshot" can be an identification of selected items and/or features of the UI (UI elements), a graphical image of the screen, the table structure of the UI state, etc.

Application Server 2708

The Application Server carries out the ILP application's logic, including state recognition, and performing the specified actions at each state. The application server also serves as a platform for accessing the ILP application via e.g. HTTP, SOAP, etc. Thus, the application server can include a state recognition module (described above) and a pattern replay engine (described above).

Visual Tool 2710

The Visual Tool allows the use of VILP, where the programming is done visually by interacting with the application. The user can visually designate states and actions, and record events as they are performed against the application to be replayed at runtime. In a preferred embodiment, the visual tool is an IDT, mentioned above.

Scalability

Because ILP accesses the application through the user interface, a large amount of system resources are potentially used up by each ILP user session. Note however, that the current model for distributed computing is that each user has a fairly powerful desktop machine that runs the client, while a high-powered server processes client requests. Thus a worst-case scenario might require that for each ILP user session a single desktop workstation is required to run the application. In fact the ILP system allows multiple user sessions to be created on a single server machine. So, in fact, ILP is more scalable than current distributed computing practices. Compared to the cost of even thin-client terminals such as PDAs, the cost of using ILP to enable these new client terminals to access existing applications is small. If a $1000. server can support 10. simultaneous users, that is a cost of $100. per simultaneous user. The actual cost per user is even lower unless all users are always simultaneously accessing the system. Compared to a low-end PDA, which would cost $100, this is minimal. And compared to the development costs of replacing the application, or integrating it with other applications at the source code level, ILP is a very favorable choice.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating an application, comprising:
   recording an interaction with a first application for capturing a functionality of the first application;
   recording an interaction with a second application for capturing a functionality of the second application;
   generating a pattern based on the recorded interactions; and
   generating new application based on the pattern, wherein the interactions recorded in the pattern are repeated upon replay of the pattern for providing the functionalities ties of the first and second applications.

2. The method as recited in claim 1, wherein the interaction with the first application is at a user interface level of the first application.

3. The method as recited in claim 1, wherein the first and second applications are selected from a group consisting of: a web application, a web service, a database application, a legacy application, and a mainframe application.

4. The method as recited in claim 1, wherein generating the new application includes adding additional functionality to the pattern.

5. The method as recited in claim 1, further comprising displaying the pattern on a graphical user interface, wherein the pattern includes a graphical representation of each interaction.

6. The method as recited in claim 1, wherein recording the interaction with the first application includes:
   displaying an interface;
   allowing a user to specify interactions with the first application via the interface; and
   recording the user interactions.

7. The method as recited in claim 1, further comprising publishing the new application as a network service.

8. The method as recited in claim 1, further comprising specifying a rendering of output front the new application for output on m multiple types of devices.

9. A computer program product embodied on a computer readable medium for generating an application the computer program product comprising:
   computer code for recording an interaction with a first application for capturing a functionality of the first application;
   computer code for recording an interaction with a second application for capturing a functionality of the second application;
   computer code for generating a pattern based on the recorded interactions; and
   computer code for generating an application based on the pattern, wherein the interactions recorded in the pattern are repeated upon replay of the pattern for providing the functionalities of the first and second applications.

10. A system embodied on a computer readable medium for generating an application, comprising:
   logic for recording, an interaction with a first application for capturing a functionality of the first application;
   logic for recording an interaction with a second application for capturing a functionality of the second application;
   logic for generating a pattern based on the recorded interactions; and
   logic for generating an application based on die pattern, wherein the interactions recorded in the pattern are repeated upon replay of the pattern for providing the functionalities of the first and second applications.

11. A method, comprising:
   displaying an interface;
   allowing a user to specify interactions with multiple applications via the interface;
   recording the interactions;
   generating a pattern based on the recorded interactions;
   displaying the pattern on a graphical user interface, wherein the pattern includes a graphical representation on of each interaction;

allowing the user to add additional functionality to the pattern, wherein a graphical representation of the additional functionality is displayed on the graphical user interface; and allowing the user to connect representations of the interactions via the graphical user interface for specifying an order of execution of the interactions in the pattern.

12. The method as recited in claim 11, wherein the pattern further includes prerecorded interactions.

13. The method as recited in claim 11, further comprising recognizing a portion of the pattern as a prefix of an already existing pattern, and creating a branching of the pattern from the already existing pattern.

14. The method as recited in claim 11, further comprising allowing specification of output relating to the pattern for in multiple client devices.

15. A method, comprising:
displaying an interface;
allowing a user to specify interactions with multiple applications via the interface;
recording the interactions;
generating a pattern based on the recorded interactions;
displaying the pattern on a graphical user interface, wherein the pattern includes a graphical representation of each interaction;
allowing the user to add additional functionality to the pattern, wherein a graphical representation of the additional functionality is displayed on the graphical user interface; and
coupling the pattern to another pattern.

16. The method as recited in claim 15, wherein the pattern further includes prerecorded interactions.

17. The method as recited in claim 15, further comprising recognizing a portion of the pattern as a prefix of an already existing pattern, and creating, a branching of the pattern from the already existing pattern.

18. The method as recited in claim 15, further comprising allowing specification of output relating to the pattern for multiple client devices.

19. A method, comprising:
determining a current state of an existing application based on user interface output of the application;
performing an action pre-defined for the current state of the existing application; and
retrieving data from the existing application, wherein the data is generated in response to the performance of the action;
wherein some elements of the user interface output have a different weighting than other elements for allowing other user interface output data to be treated as the same state.

20. The method as recited in claim 19, wherein the state is determined based on elements of the user interface output of the existing application.

21. The method as recited in claim 19, further comprising repeating the method if performing the action results in a state transition.

22. The method as recited in claim 19, wherein the application is selected from a group consisting of: a web application, a web service, a database application, a legacy application, and a mainframe application.

23. A method, comprising:
determining a current state of an existing application based on user interface output of the application;
performing an action pre-defined for the current state of the existing application; and
retrieving data from the existing application, wherein the data is generated in response to the performance of the action;
wherein the state is determined based on a computation of a recognition score of each possible state of the existing application based on a weighted presence of user interface elements in the user interface output.

24. The method as recited in claim 23, further comprising repeating the method if performing the action results in a state transition.

25. The method as recited in claim 23, wherein the application is selected from a group consisting of a web application, a web service, a database application, a legacy application and a mainframe application.

26. A method for creating and executing an application utilizing a graphical user interface, comprising:
displaying an interface;
allowing a user to specify interactions with multiple applications via the interface;
wherein the interaction with a first application is at a user-interface level of the first application;
recording the interactions;
generating a pattern based on the recorded interactions;
displaying the pattern on a graphical user interface, wherein the pattern includes a graphical representation of each interaction;
allowing the user to add additional functionality to the pattern, wherein a graphical representation of the additional functionality is displayed on the graphical user interface;
allowing the user to connect representations of the interactions via the graphical user interface for specifying an order of execution of the interactions in the pattern;
recognizing a portion of the pattern as a prefix of an already existing pattern, and creating a branching of the pattern from the already existing pattern;
coupling the pattern to another pattern;
allowing specification of output relating to the pattern for multiple client devices;
saving the pattern in memory;
wherein the pattern further includes prerecorded, interactions;
generating an application based on the pattern, wherein the interactions recorded in the pattern are repeated upon replay of the pattern for providing the functionalities of the applications;
publishing the application as a network service;
receiving a request for data;
selecting a pattern for retrieving the requested data, the pattern having stored therein a recorded interaction with at least one external application, the interaction being for obtaining data;
replaying the pattern;
conducting the recorded interaction as specified in the pattern for obtaining the requested data;
receiving the requested data;
processing the received data for output on multiple types of devices; and
outputting the data.

* * * * *